United States Patent
Park et al.

(10) Patent No.: US 9,420,082 B2
(45) Date of Patent: Aug. 16, 2016

(54) WIRELESS RECEIVER AND METHOD FOR CONTROLLING THE SAME

(71) Applicant: LG ELECTRONICS INC., Seoul (KR)

(72) Inventors: Jongseok Park, Seoul (KR); Sangwoo Seo, Seoul (KR); Taeseong Kim, Seoul (KR); Youchang Kim, Seoul (KR); Hyunsun Yoo, Seoul (KR); Yujune Jang, Seoul (KR); Jeongyoon Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/285,449

(22) Filed: May 22, 2014

(65) Prior Publication Data

US 2015/0244848 A1 Aug. 27, 2015

(30) Foreign Application Priority Data

Feb. 21, 2014 (KR) .......................... 10-2014-0020730

(51) Int. Cl.
| | |
|---|---|
| *H04W 4/00* | (2009.01) |
| *H04M 1/60* | (2006.01) |
| *G06F 3/01* | (2006.01) |
| *H04M 1/05* | (2006.01) |
| *H04M 1/57* | (2006.01) |
| *G06F 3/0362* | (2013.01) |
| *G06F 3/0484* | (2013.01) |
| *G06F 3/0354* | (2013.01) |
| *H04M 3/42* | (2006.01) |
| *H04W 4/16* | (2009.01) |

(Continued)

(52) U.S. Cl.
CPC ............. *H04M 1/6066* (2013.01); *G06F 3/017* (2013.01); *G06F 3/0354* (2013.01); *G06F 3/0362* (2013.01); *G06F 3/04847* (2013.01); *H04M 1/05* (2013.01); *H04M 1/578* (2013.01); *H04M 3/42042* (2013.01); *H04M 19/04* (2013.01); *H04W 4/16* (2013.01); *H04W 68/00* (2013.01); *H04M 2250/12* (2013.01)

(58) Field of Classification Search
CPC ...... H04W 4/005; H04W 4/006; H04W 4/008
See application file for complete search history.

(56) References Cited

U.S. PATENT DOCUMENTS

| | | | |
|---|---|---|---|
| 2006/0183513 A1 | 8/2006 | Slamka et al. | |
| 2006/0212938 A1* | 9/2006 | Suzuki ............................ | 726/16 |

(Continued)

OTHER PUBLICATIONS

European Patent Office Application Serial No. 14188366.0 Search Report dated Nov. 4, 2015, 9 pages.

(Continued)

*Primary Examiner* — Christopher M Brandt
*Assistant Examiner* — Ki Ha Nam
(74) *Attorney, Agent, or Firm* — Lee, Hong, Degerman, Kang & Waimey; Jonathan Kang; Harry Lee

(57) ABSTRACT

The present invention discloses a wireless receiver capable of outputting a notification on an event occurred in a mobile terminal and remotely controlling the mobile terminal and a method of controlling therefor. To this end, a wireless receiver may include an earphone, a short-range communication unit configured to communicate with the mobile terminal and if the mobile terminal receives an incoming signal, a controller configured to control a first audio data including information on a caller of the incoming signal to be received from the mobile terminal and control the first audio data to be outputted via the earphone.

33 Claims, 39 Drawing Sheets

(51) Int. Cl.
*H04W 68/00* (2009.01)
*H04M 19/04* (2006.01)

(56) References Cited

U.S. PATENT DOCUMENTS

| | | | |
|---|---|---|---|
| 2007/0234387 A1* | 10/2007 | You | 725/39 |
| 2008/0130910 A1 | 6/2008 | Jobling et al. | |
| 2008/0220831 A1 | 9/2008 | Alameh et al. | |
| 2009/0022294 A1 | 1/2009 | Goldstein et al. | |
| 2009/0097689 A1* | 4/2009 | Prest et al. | 381/380 |
| 2009/0113005 A1 | 4/2009 | Gregg et al. | |
| 2010/0048235 A1* | 2/2010 | Dai et al. | 455/518 |
| 2010/0075722 A1* | 3/2010 | Pei | H04M 1/6066 455/569.1 |
| 2011/0092157 A1 | 4/2011 | Clark et al. | |
| 2012/0058783 A1* | 3/2012 | Kim et al. | 455/456.2 |
| 2012/0196540 A1 | 8/2012 | Pearce | |
| 2013/0065569 A1* | 3/2013 | Leipzig et al. | 455/416 |
| 2013/0189963 A1* | 7/2013 | Epp et al. | 455/414.1 |
| 2013/0217370 A1* | 8/2013 | Gerald et al. | 455/415 |
| 2013/0244633 A1* | 9/2013 | Jacobs et al. | 455/415 |
| 2014/0241540 A1* | 8/2014 | Hodges | H04R 1/1091 381/74 |
| 2015/0172450 A1* | 6/2015 | Singhal | |

OTHER PUBLICATIONS

European Patent Office Application Serial No. 14188366.0, Search Report dated Jul. 3, 2015, 6 pages.

* cited by examiner

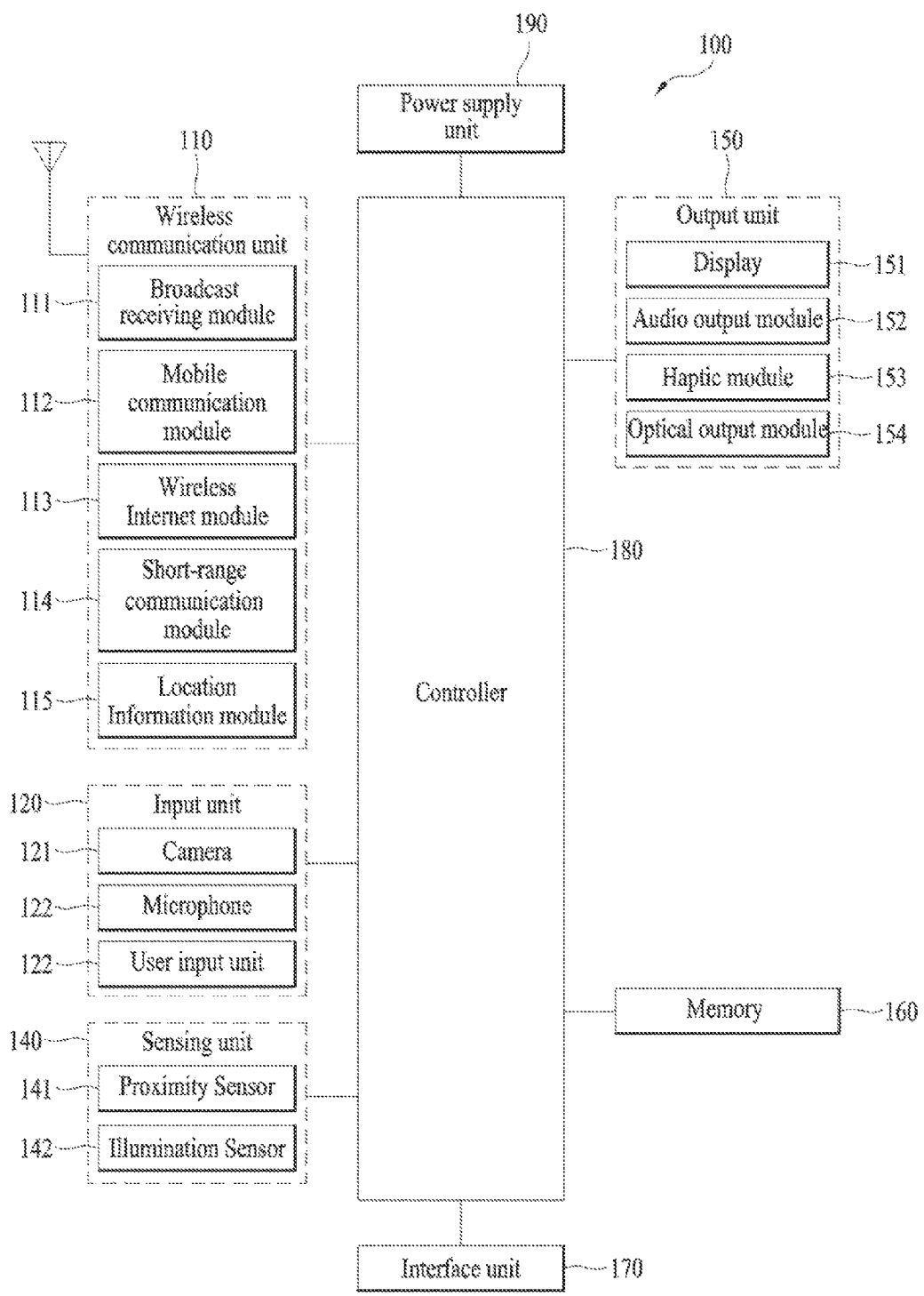

(a)  (b)

FIG. 8
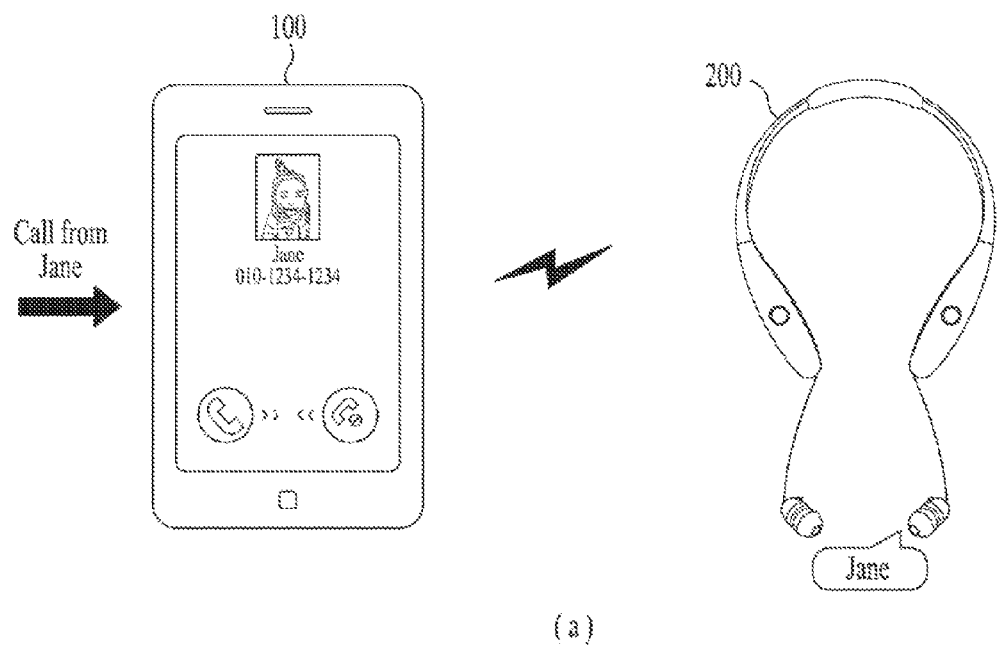
(a)
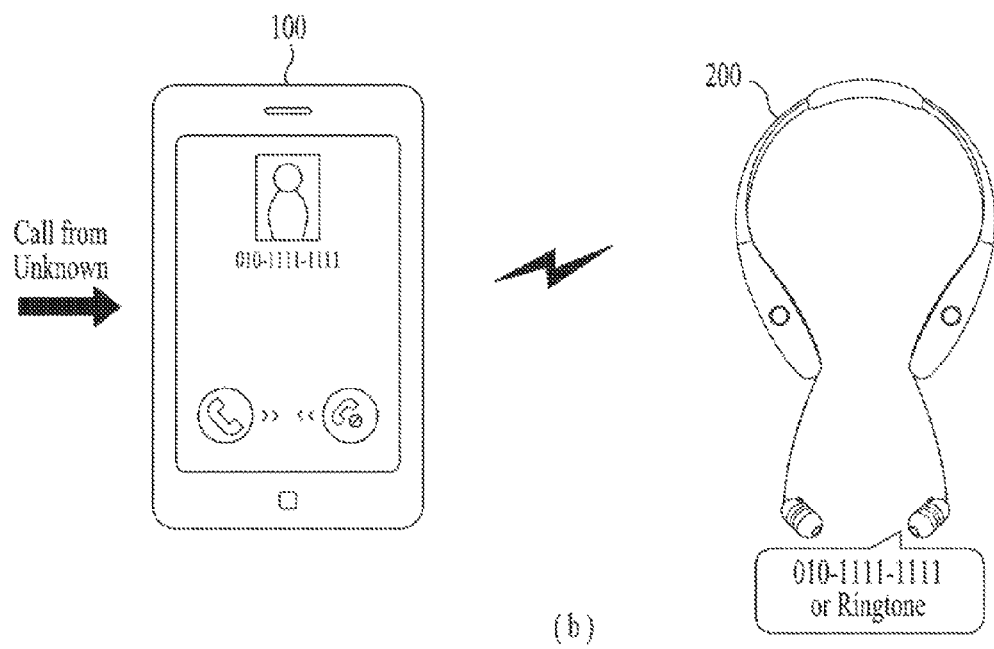
(b)

FIG. 10
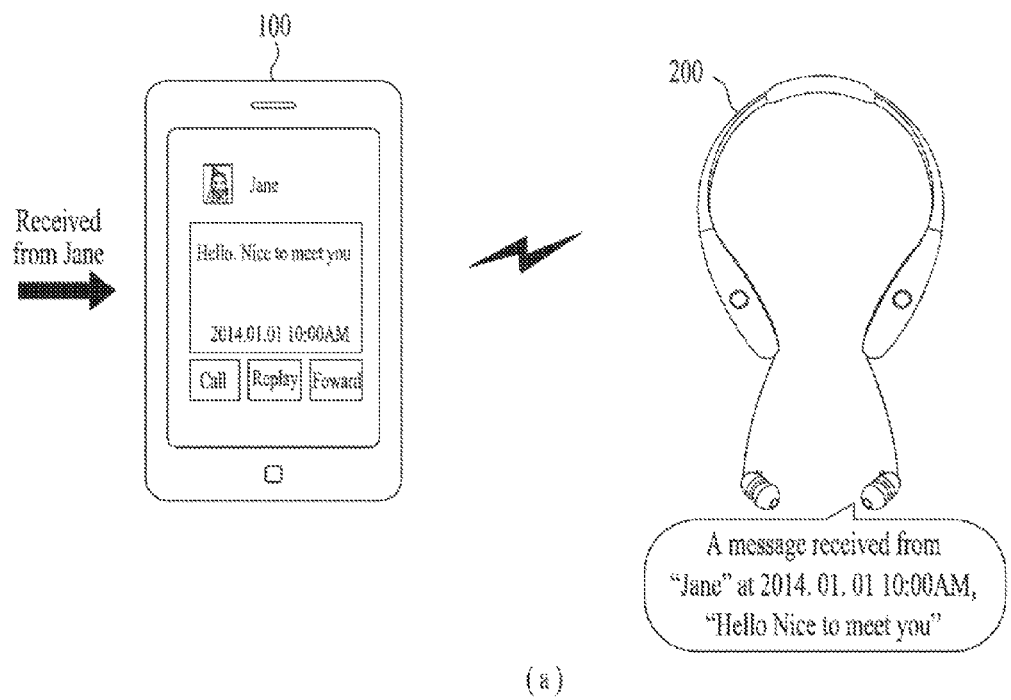
(a)
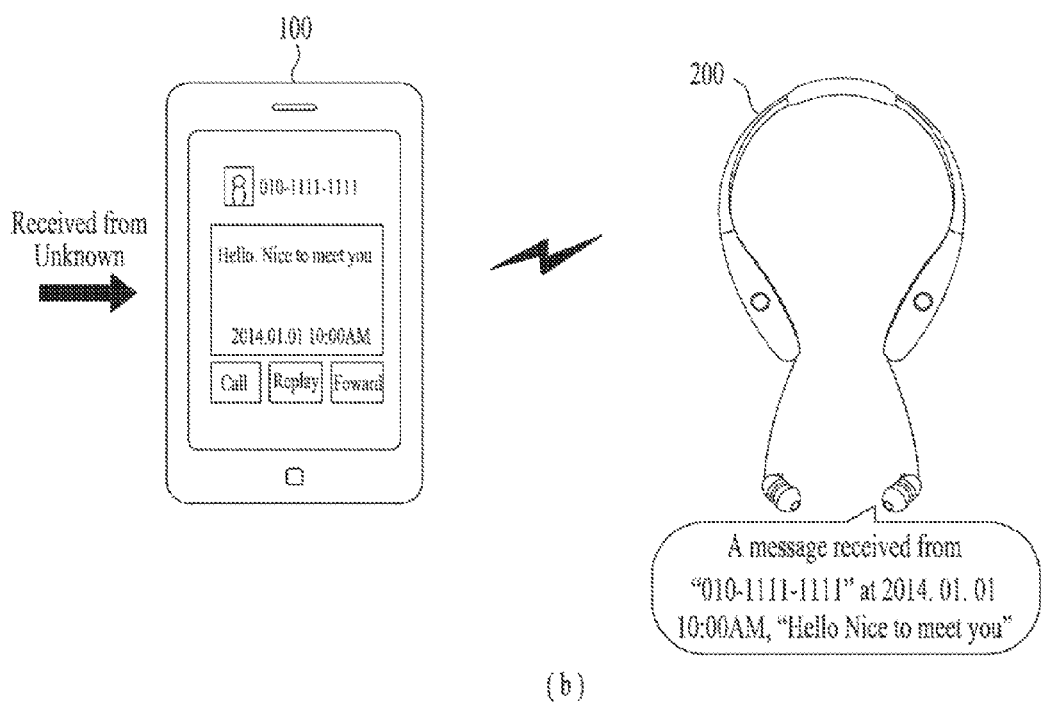
(b)

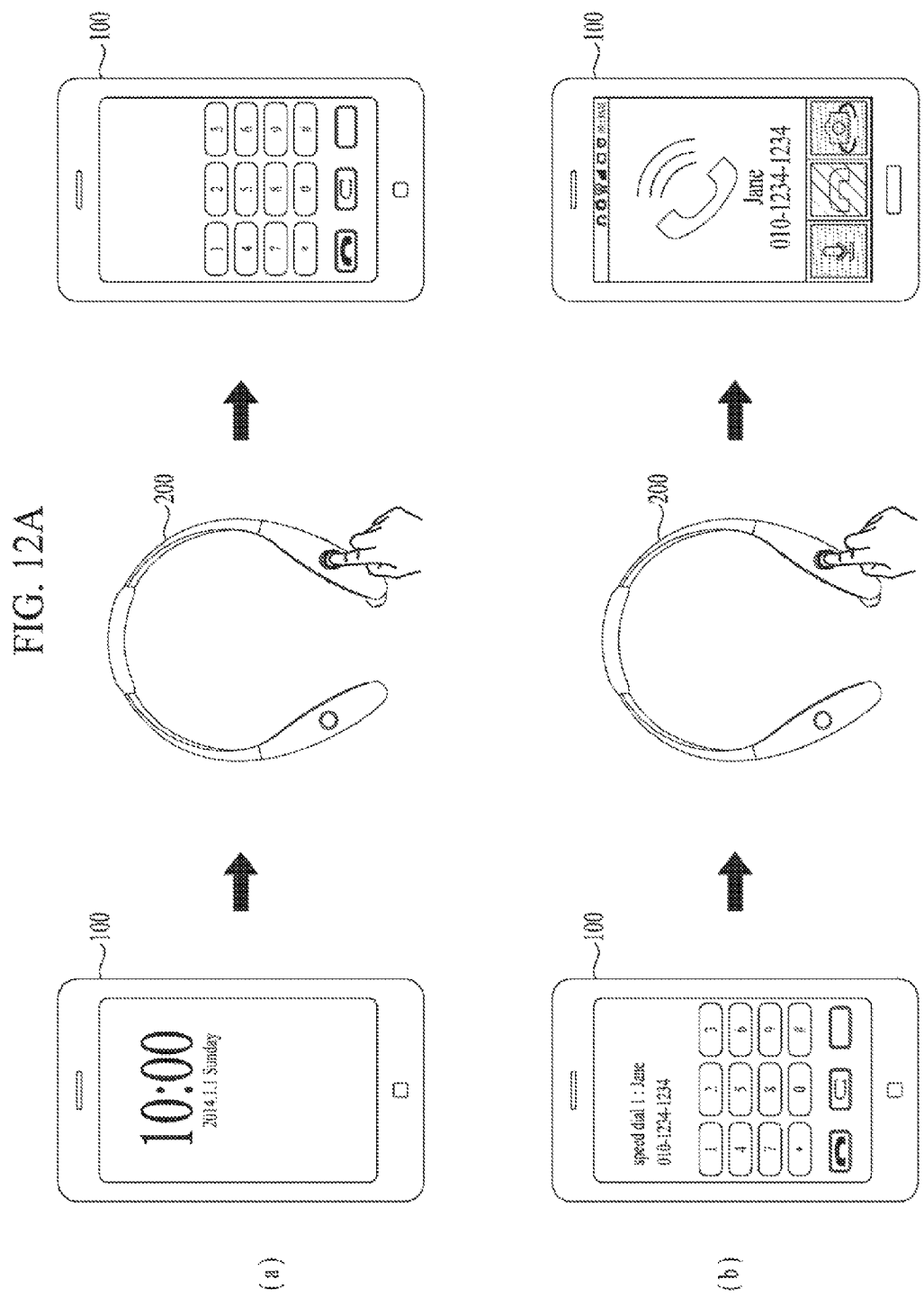

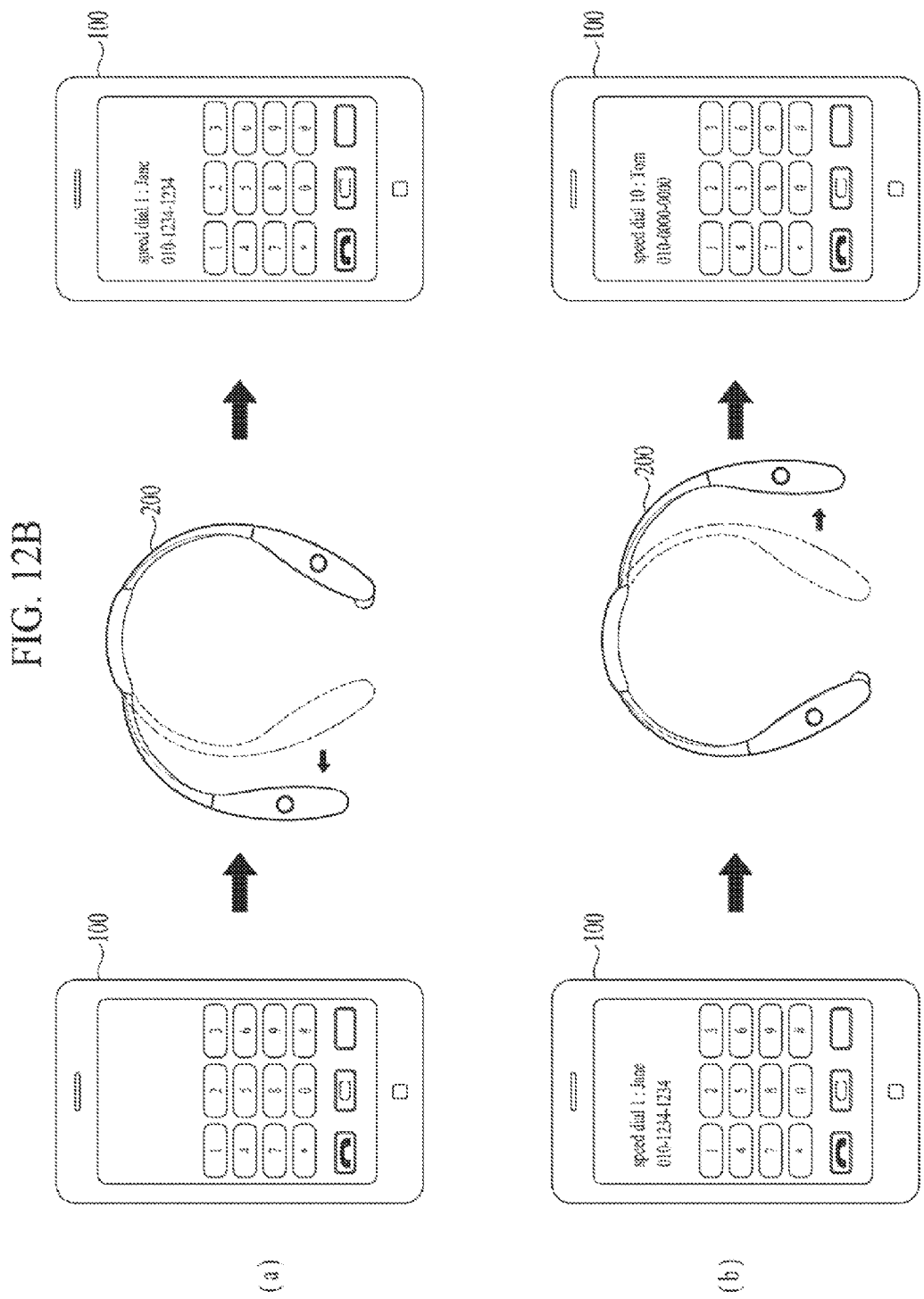

FIG. 14A
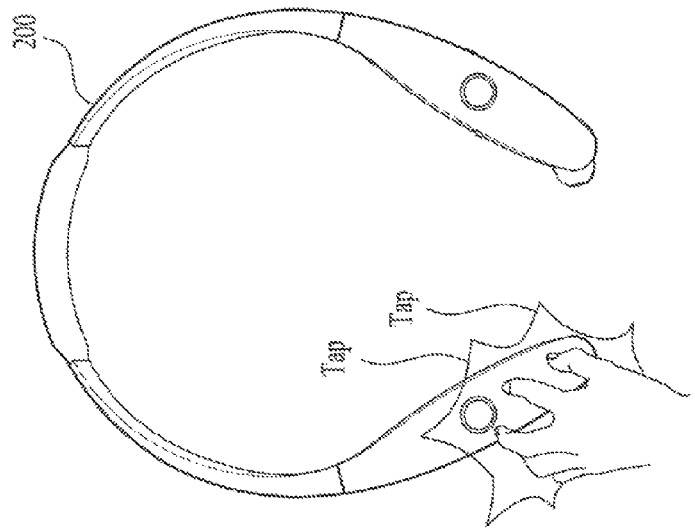
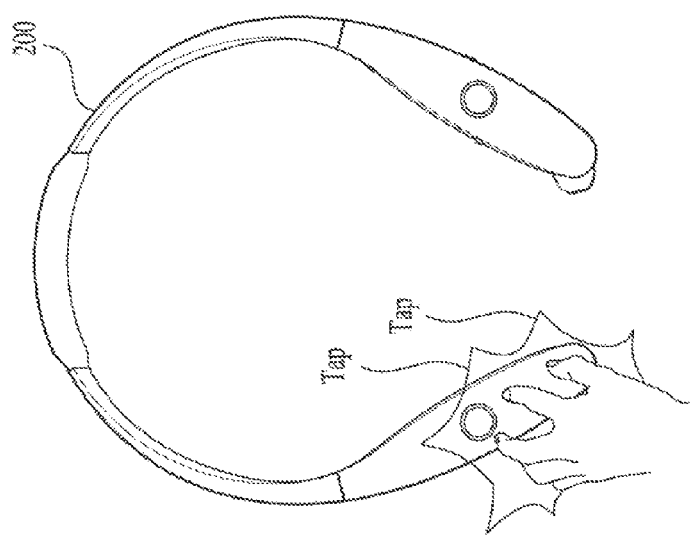

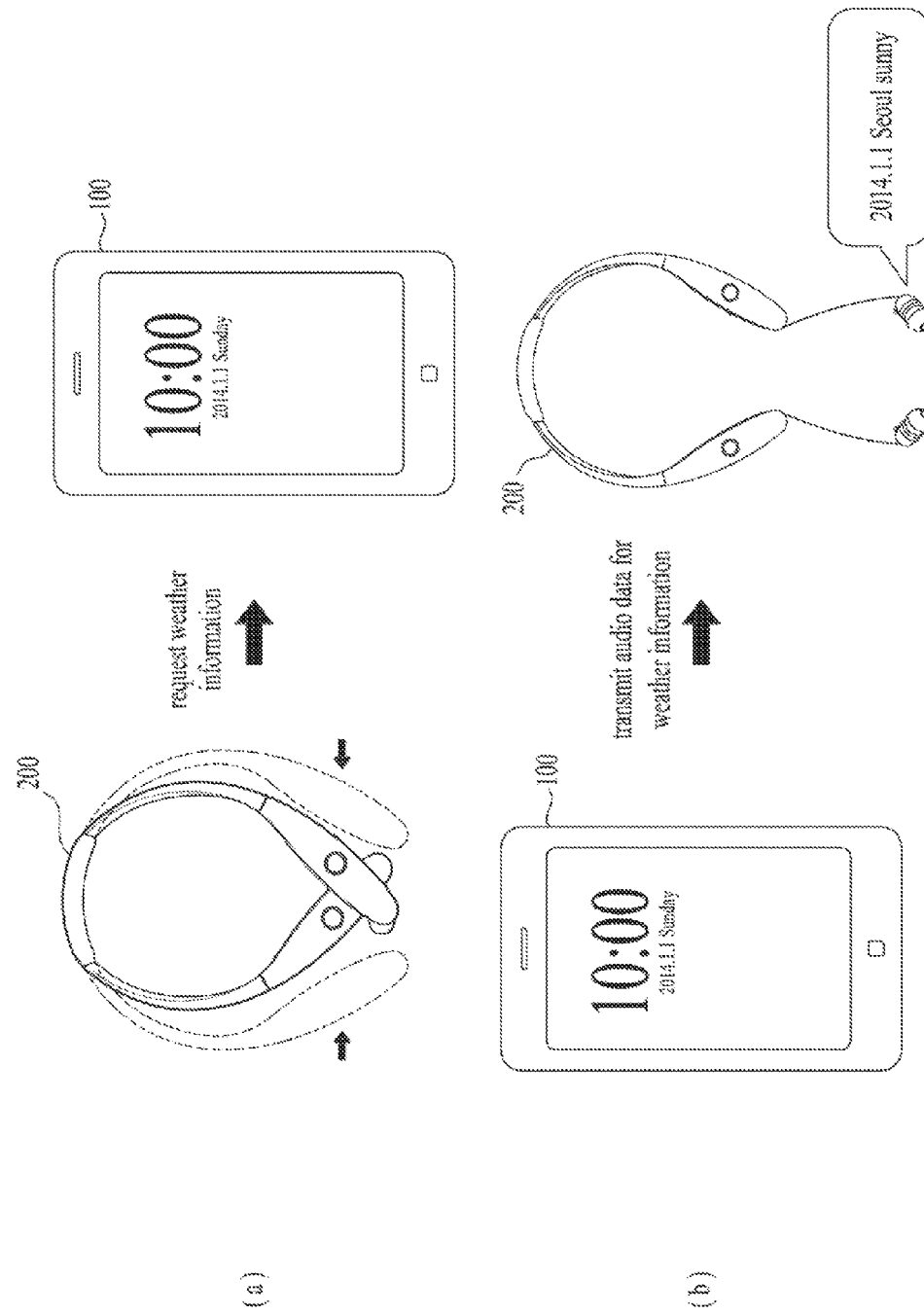

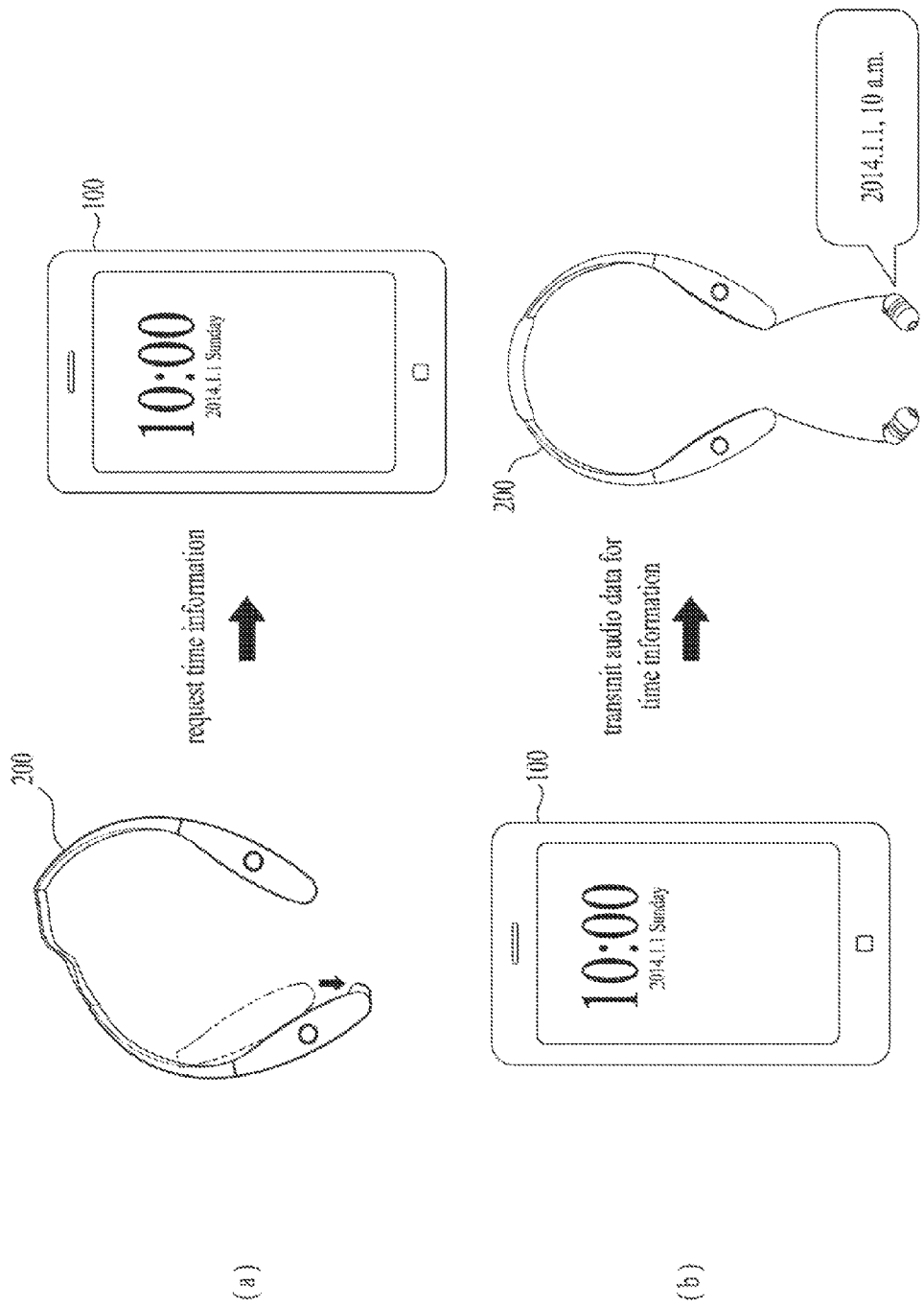

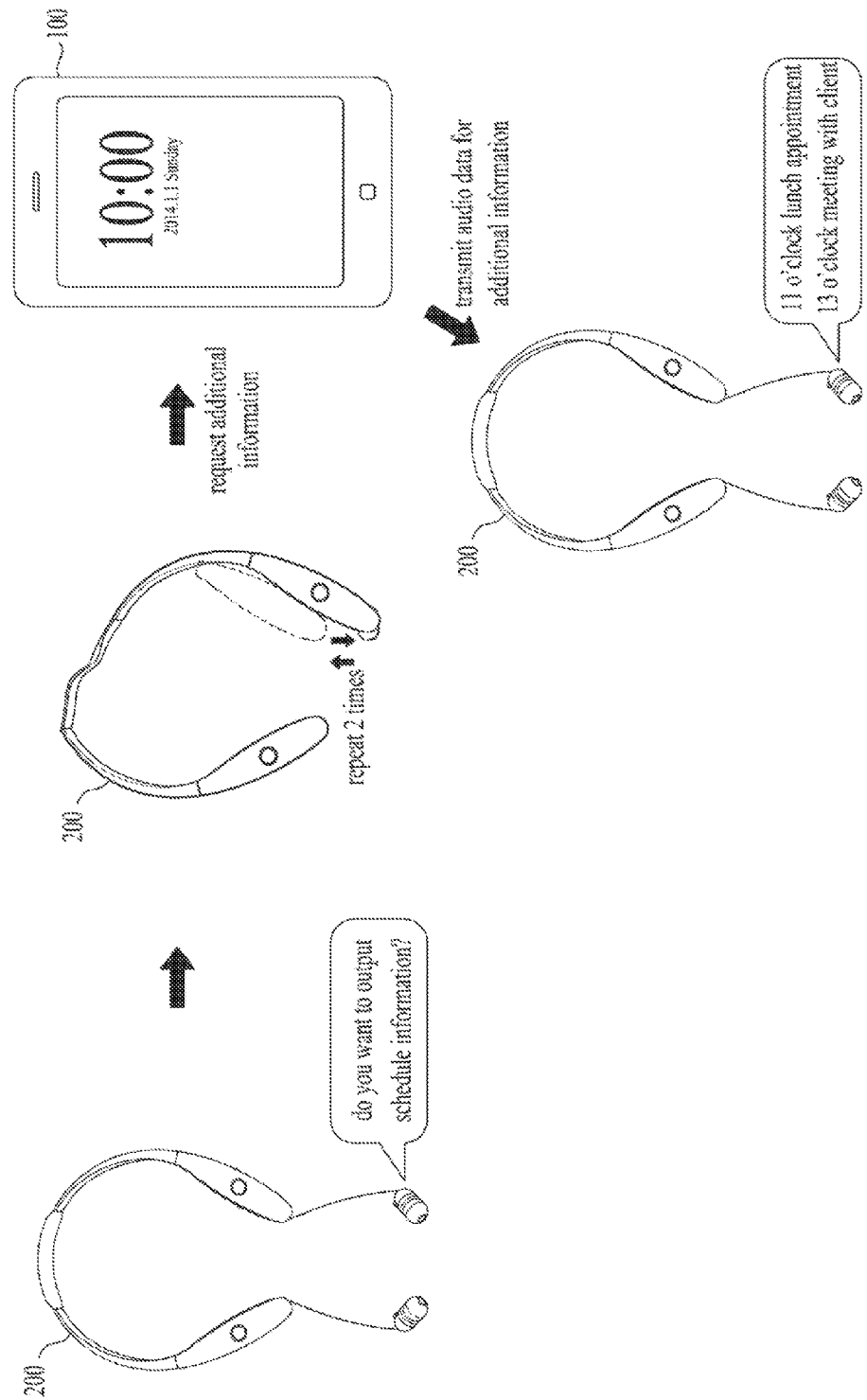

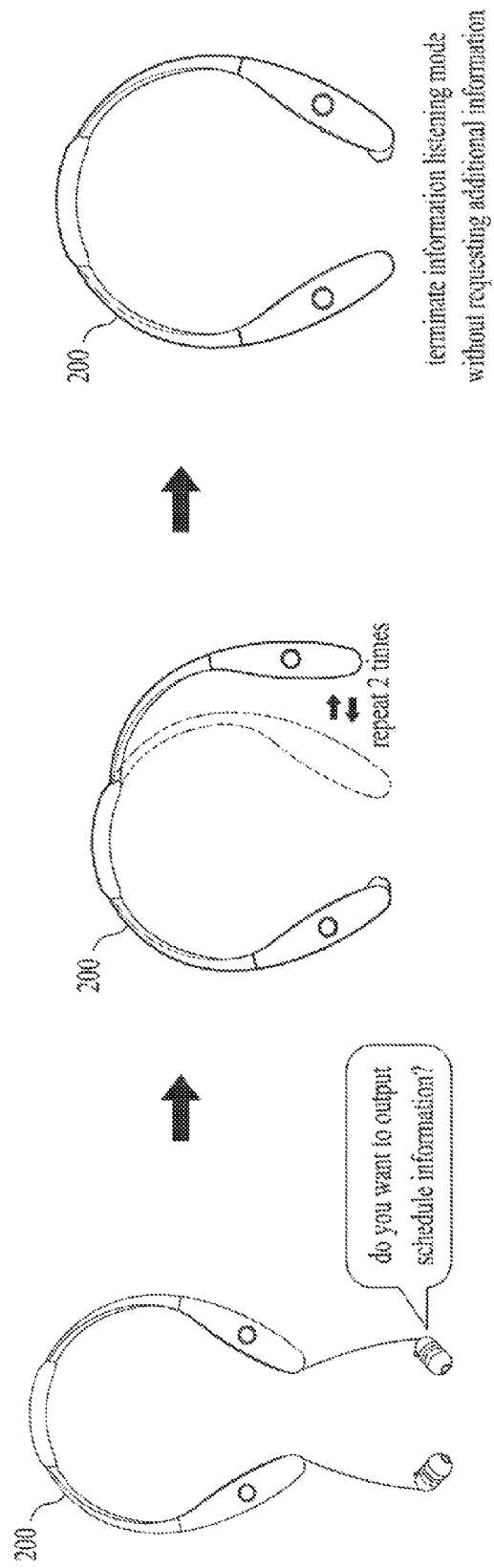

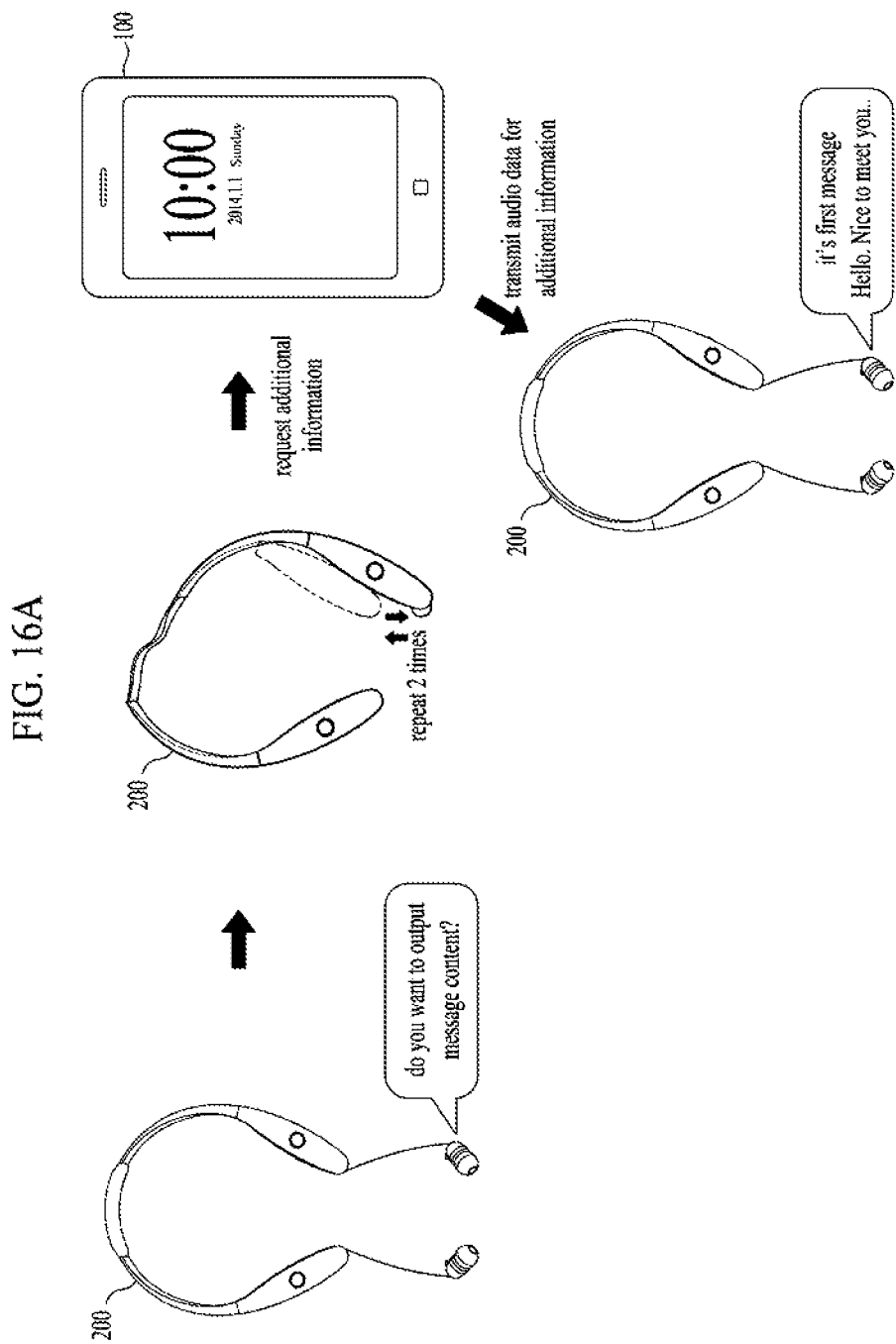

WIRELESS RECEIVER AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2014-0020730, filed on Feb. 21, 2014, the contents of which are hereby incorporated by reference herein in its entirety.

BACKGROUND OF THE INVENTION

1. Field of the Invention

The present invention relates to a wireless receiver capable of outputting a notification for an event occurred in a mobile terminal and remotely controlling the mobile terminal and a method of controlling the same.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

If an earphone is connected with a mobile terminal, a user can appreciate audio data generated by the mobile terminal alone. Yet, if a wired earphone is connected with the mobile terminal, it is cumbersome and difficult to manage the earphone. Hence, recently, a wireless receiver using a short range communication is widely used. Examples of the most widely used wireless receiver may include a Bluetooth earphone and a Bluetooth headset.

Yet, a current wireless receiver performs a role of outputting audio data of a multimedia file including music, videos or the like only in a manner of receiving the audio data of the multimedia file from the mobile terminal Hence, various methods intending to enhance convenience of a user putting the wireless receiver on in a manner of increasing functions of the wireless receiver are under discussion.

SUMMARY OF THE INVENTION

Accordingly, embodiments of the present invention are directed to a mobile terminal and controlling method thereof that substantially obviate one or more problems due to limitations and disadvantages of the related art.

The present invention is contrived by the aforementioned necessity. An object of the present invention is to provide a wireless receiver enhancing user convenience and a method of controlling therefor.

Specifically, an object of the present invention is to provide a wireless receiver capable of outputting audio data of a caller who made a call to a mobile terminal and a method of controlling therefor.

Moreover, another object of the present invention is to provide a wireless receiver capable of remotely controlling a mobile terminal and a method of controlling therefor.

To achieve these objects and other advantages and in accordance with the purpose of the invention, as embodied and broadly described herein, according to one embodiment, a wireless includes an earphone, a short-range communication unit configured to communicate with the mobile terminal and if the mobile terminal receives an incoming signal, a controller configured to control a first audio data including information on a caller of the incoming signal to be received from the mobile terminal and control the first audio data to be outputted via the earphone.

In another aspect of the present invention, a method of controlling a wireless receiver includes the steps of if the mobile terminal receives an incoming signal, receiving a first audio data containing information on a caller of the incoming signal from the mobile terminal and outputting the first audio data via an earphone.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 8 is a diagram for an example that an audio data outputted via a wireless receiver varies according to whether a caller is registered in an address book;

FIG. 10 is a diagram for an example that an audio data outputted via a wireless receiver varies according to whether a sender is registered in an address book;

FIGS. 12A and 12B are diagrams for explaining an embodiment of making a call using a wireless receiver;

FIGS. 14A to 14D are diagrams for examples of outputting information of a specific type via a wireless receiver;

FIGS. 15A and 15B are diagrams for examples of outputting additional information related to time information;

FIGS. 16A and 16B are diagrams for examples of outputting additional information related to unchecked event information;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
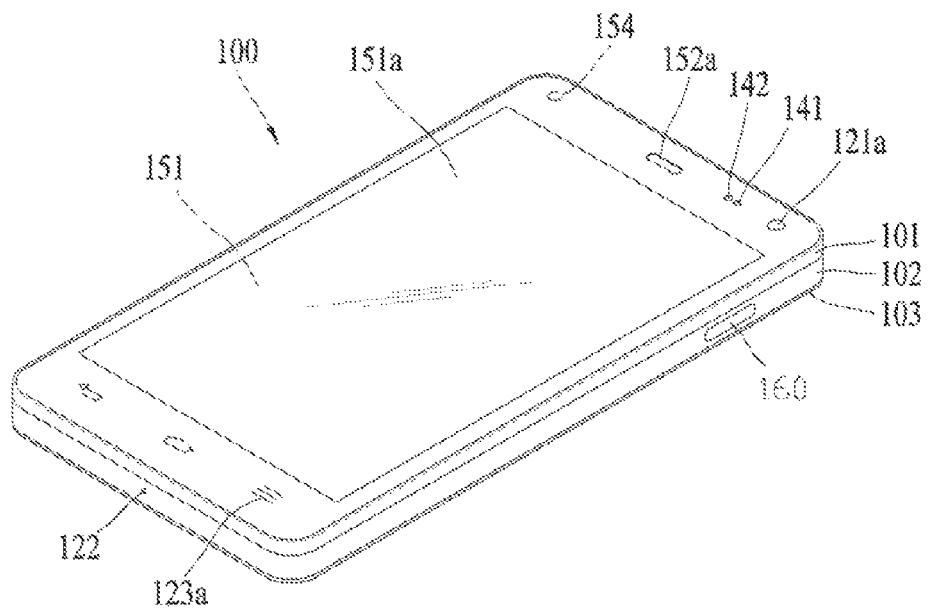
FIGS. 1B and 1C are conceptual views of one example of the mobile terminal, viewed from different directions.
Figure 1C:
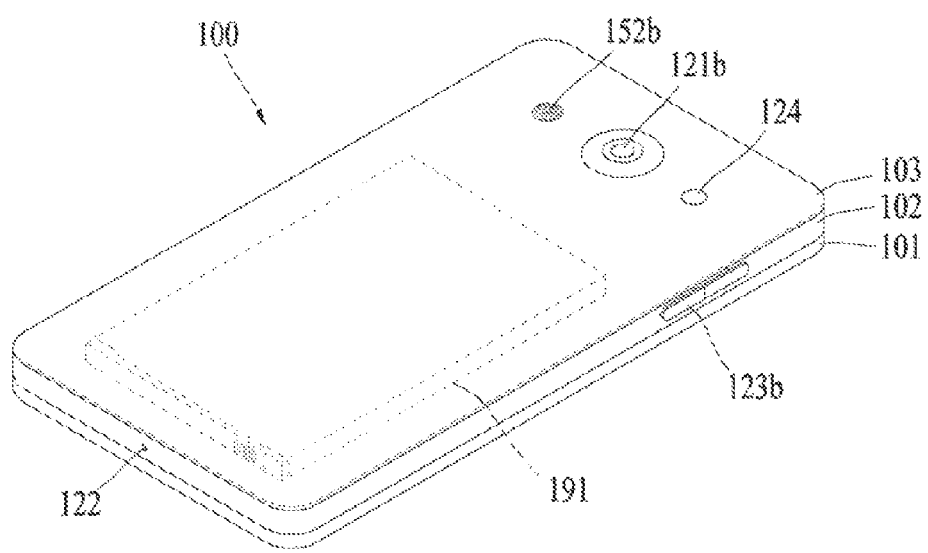

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 mentioned earlier with reference to FIG. 1A to FIG. 1C may be connected with a wireless receiver 200. The wireless receiver 200 receives audio data from the mobile terminal 100 and can output the received audio data. If the audio data is delivered to the wireless receiver 200, the controller 180 can control the audio data to be simultaneously outputted via the audio output module 152 and the wireless receiver 200 or can control the audio data to be outputted via the wireless receiver 200 only among the audio output module 152 and the wireless receiver 200. The wireless receiver 200 is explained in detail with reference to following drawings.

Figure 2:
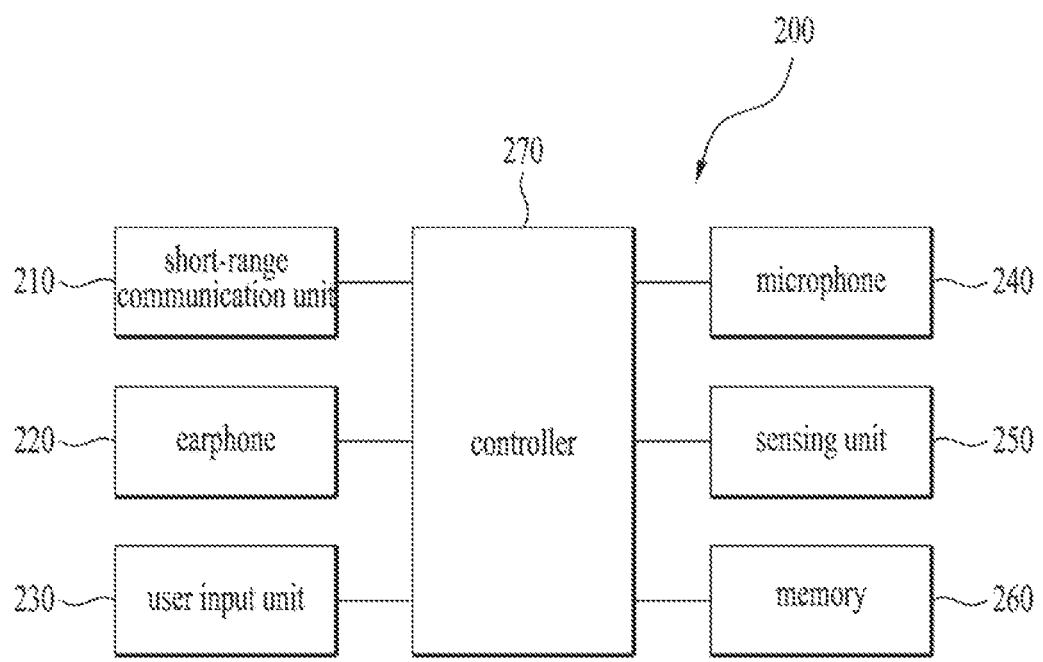
FIG. 2 is a block diagram for a wireless receiver.

FIG. 2 is a block diagram for a wireless receiver. Referring to FIG. 2, the wireless receiver 200 can include a short-range communication unit 210, an earphone 220, a user input unit 230, a microphone 240, a sensing unit 250, a memory 260 and a controller 270.

The short-range communication unit 210 is a component used for performing a radio communication with the mobile terminal 100. As a representative example, Bluetooth can be applied between the wireless receiver 200 and the mobile terminal 100. In this case, the wireless receiver 200 and the mobile terminal 100 can be connected with each other via pairing. Besides the Bluetooth, it is apparent that other short-range communication technologies can also be applied between the wireless receiver 200 and the mobile terminal 100.

The earphone 220 can output the audio data received from the mobile terminal 100. A pair (left and right) of earphones 220 can be installed in the wireless receiver 200 or a single earphone 220 can be installed in either the left or the right of the wireless receiver. The controller 270 can transmit the audio data to be outputted from the earphone 220 via a cable connected with the earphone 200.

If a user input is received, the user input unit 230 plays a role of generating an input signal. As an example, the user input unit 230 can include a playback control button for controlling playback or pause of such an audio file as music, a video and the like, a call button for answering a call made to the mobile terminal 100, a volume button for adjusting volume, a power button for controlling on/off of the wireless receiver 200 and the like. The user input unit 230 may have a form capable of being pushed by a user and may have a touch sensor capable of detecting a touch of the user.

The microphone 240 can receive voice of a user. If a phone call is made by the mobile terminal 100, the user can perform the phone call by inputting voice of the user by the microphone 240. The controller 240 may generate a control command for remotely controlling the mobile terminal 100 based on the voice of the user inputted via the microphone 240.

The sensing unit 250 can detect a status change of the wireless receiver 200. Specifically, the sensing unit 250 detects a pressure on the wireless receiver 200, a movement of the wireless receiver 200, distortion of the wireless receiver 200, moving of the wireless receiver 200 and the like and may generate a detection signal.

The memory 260 can store a program for operation of the controller 270 and can temporarily store input/output data (e.g., audio data received from the mobile terminal 100, a control command generated by the controller 270 and the like). The memory 260 can store data on various control commands, which will be generated when a user input is received.

The controller 270 controls overall operation of the wireless receiver 200. Specifically, the controller 270 decodes the audio data received from the mobile terminal 100 and can control the decoded audio data to be outputted via the earphone 220. If such an event as message reception, incoming call reception or the like occurs in the mobile terminal 100, the controller can control such a feedback as a vibration and the like to be outputted. Moreover, the controller 270 generates a control signal based on an input signal occurred in the user input unit 230 and can control the generated control signal to be transmitted to the mobile terminal 100. The controller 270 detects a gesture input based on a signal sensed by the sensing unit 250 and may generate a control signal based on the gesture input.

Although it is not depicted, the wireless receiver 200 may further include a vibration output unit to output a vibration.

Figure 3A:
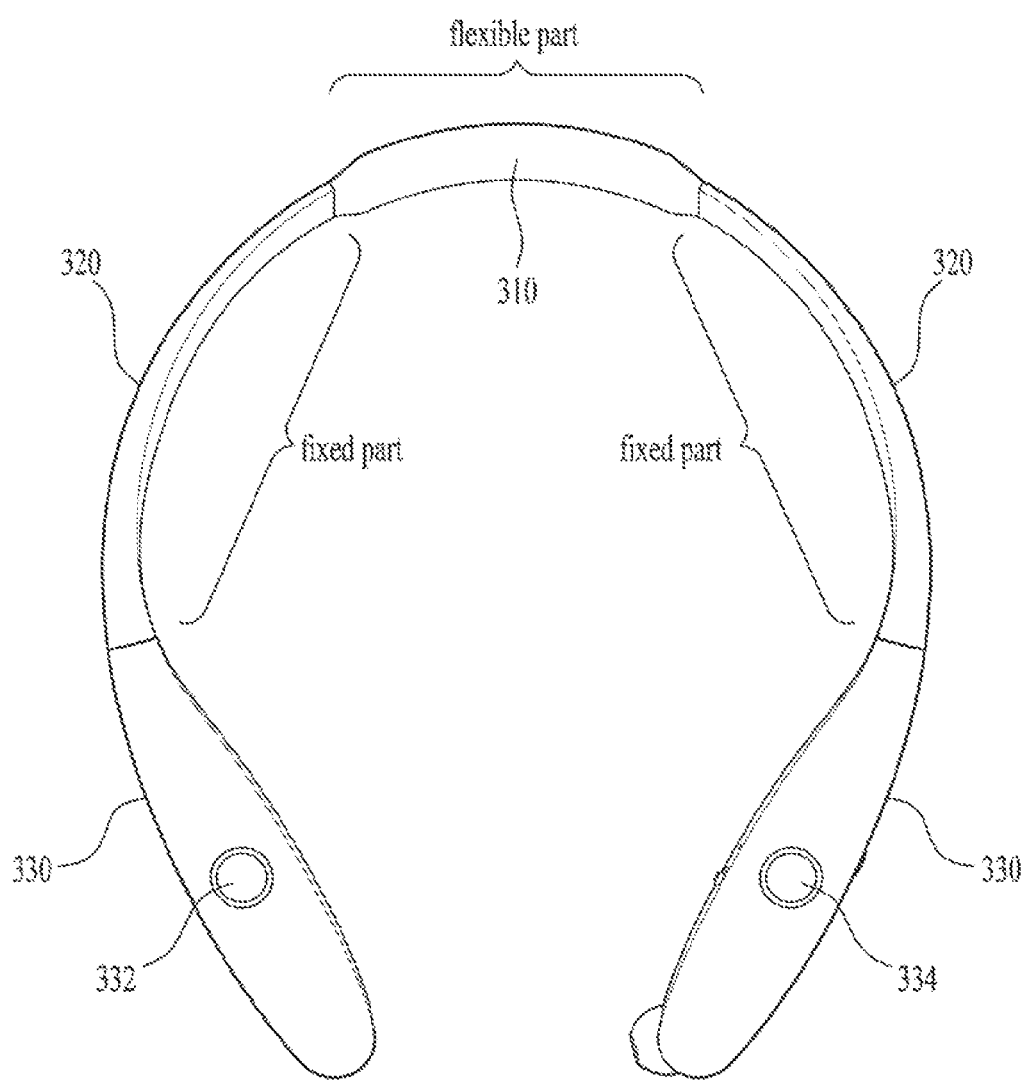
FIGS. 3A and 3B are diagrams of a front view and a rear view of a wireless receiver, respectively.
Figure 3B:
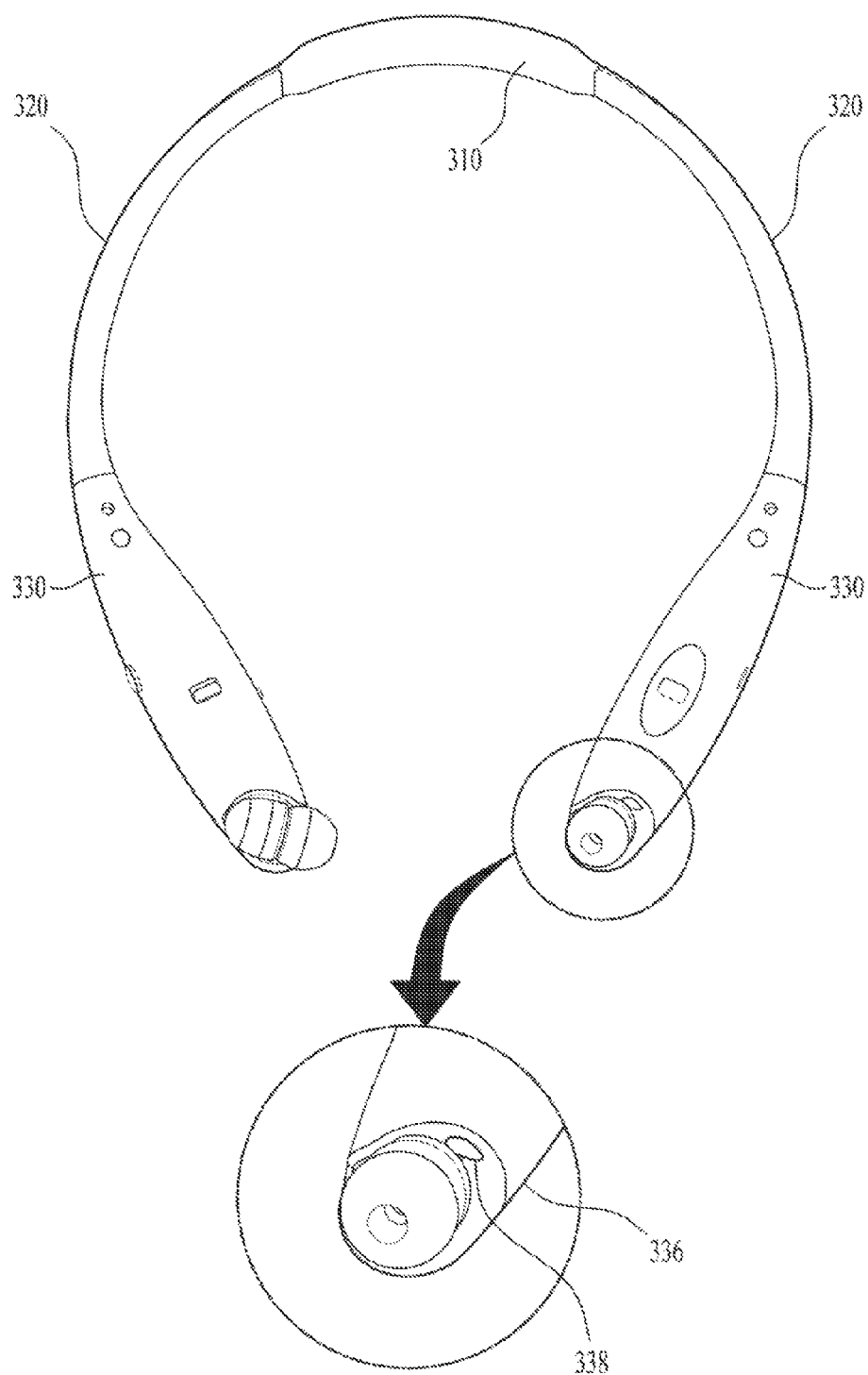
Figure 3C:
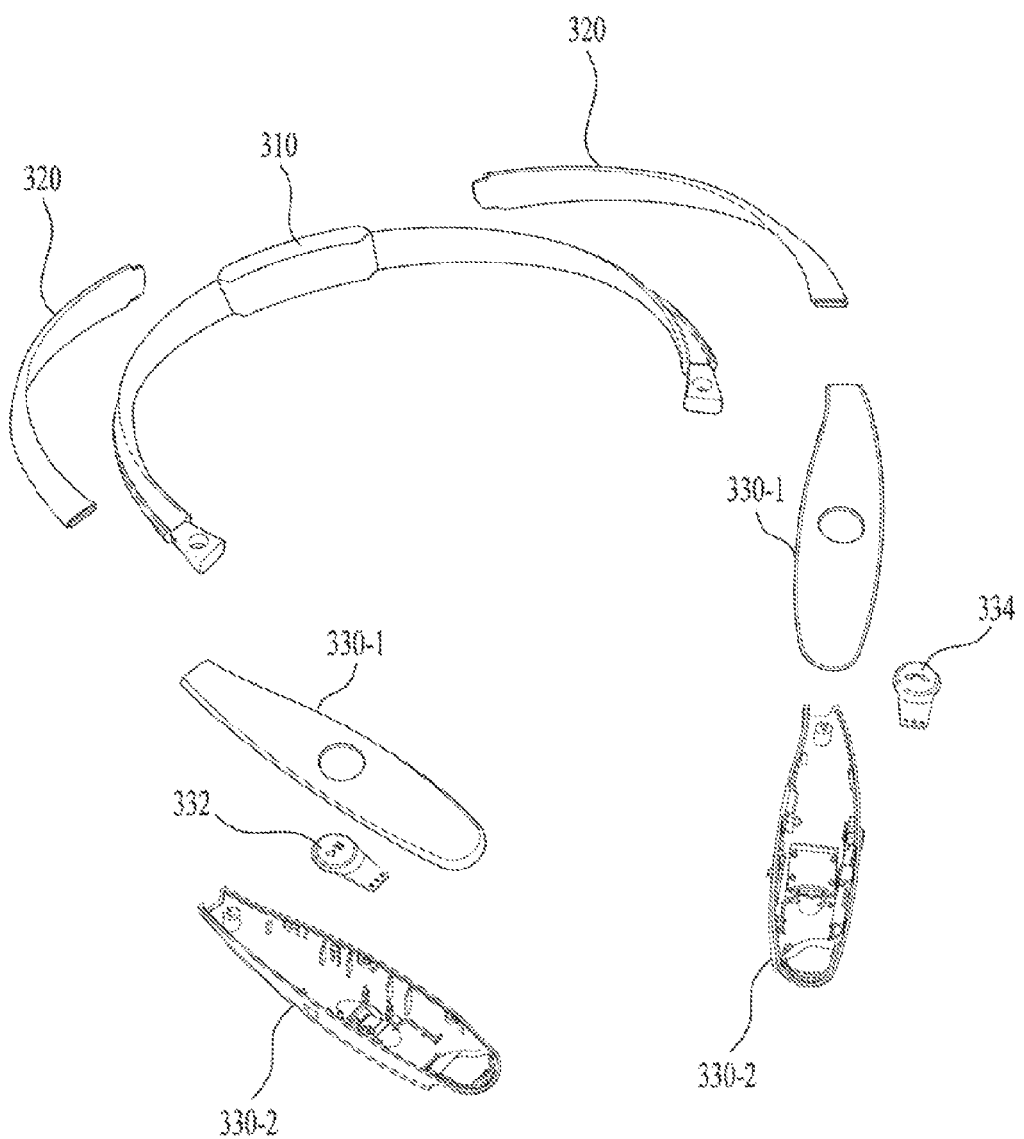
FIG. 3C is an exploded diagram of a wireless receiver.

FIGS. 3A and 3B are diagrams of a front view and a rear view of a wireless receiver, respectively and FIG. 3C is an exploded diagram of the wireless receiver. The wireless receiver 200 may have a form of a circle in which a part of the circle is opened. Hence, a user can use the wireless receiver 200 in a manner of putting the wireless receiver around a neck of the user via an opened space.

Specifically, referring to FIG. 3A to FIG. 3C, the wireless receiver 200 can include a band frame 310, a pair of left and right fixed frames 320 and a pair of body parts 330.

The band frame 310 forms a frame of the wireless receiver 200 and may have a form of a curve in which one side of the curve is opened to enable the wireless receiver 200 to have a form of a circle capable of putting the wireless receiver around a neck. The band frame 310 can be manufactured by a flexible material capable of being bent or buckled to some extent. As an example of the flexible material, the band frame 310 can be manufactured by such a material as leather, rubber, silicon, synthetic resins or the like.

If all parts of the band frame 310 are freely bent or buckled, since a form of the wireless receiver 200 is not constantly maintained, it may cause inconvenience for a user wearing the wireless receiver 200. Hence, the fixed frame 320 can be combined with a part of a left frame of the band frame 310 and a part of a right frame of the band frame.

The fixed frame can be manufactured by such a material not easily transformed to a different form despite of an external force as synthetic resins, metal (e.g., stainless steel (STS), aluminum (Al), and titanium (Ti)) or the like. Hence, although an external force is put on a part with which the band frame 310 and the fixed frame are combined, an original form of the part can be maintained without being transformed.

Yet, it is not preferable that all parts of the band frame 310 are combined with the fixed frame 320. If the all parts of the band frame 310 are not transformed despite of an external force in a manner that the all parts of the band frame 310 are combined with the fixed frame 320, a size of the opened space, which is formed to put the wireless receiver around a neck of the user, will not be changed as well. Hence, there may exist a problem that a user with a thick neck may not put the wireless receiver 200 around the neck of the user.

Hence, at least a part of the band frame 310 should not be combined with the fixed frame 320 to make the size of the opened space to be extended to some extent. To this end, as depicted in examples of FIG. 3A and FIG. 3B, a left part of the band frame 310 and a right part of the band frame are configured to combine with a pair of fixed frames 320 and a center part of the band frame 310 can be configured not to combine with the fixed frame 320. A distance between a pair of body parts 330 connected with the band frame 310 may increase or decrease according to bending of the center part of the band frame 310.

For clarity, a part with which the fixed frame 320 and the band frame 310 are combined is called a fixed part and the center part of the band frame 310 not combined with the fixed frame 320 is called a flexible part. By doing so, it can be comprehended as the frame of the wireless receiver 200 is consisting of a pair of left and right fixed parts and the flexible part.

The body part 330 can be connected with one end of the fixed part. The body part 330 can include a top cover 330-1 and a bottom cover 330-2. Such an electronic component as the short-range communication unit 210, the earphone 220 (specifically, wire), the user input unit 230, the sensing unit 250, the memory 260, the microphone 240, the controller 270 and the like mentioned earlier with reference to FIG. 2 can be mounted between the top cover 330-1 and the bottom cover 330-2.

A button capable of being pushed or touched by a user can be installed in the body part 330. As an example, FIG. 3A and FIG. 3C show that buttons 332/334 of a circle form are exposed to the top cover 330-1 of a left body part 330 and the top cover of a right body part 330, respectively. One of the buttons may play a role of a playback control button 332 for controlling playback of a multimedia file and the other one of the buttons may play a role of a call button 334 for making a phone call.

A user can play or stop the multimedia file on the mobile terminal 100 by controlling the playback control button 332 and can answer or decline a call using the call button 334. As an example, when a phone call is called up on the mobile terminal 100, if a user simply pushes the call button one time, it may indicate that the user intends to answer the phone call. On the contrary, if the user pushes the call button and maintains the push for more than a predetermined time, it may indicate that the user intends to decline the phone call.

A storing home 336 capable of storing the earphone 220 can be formed in one end of the body part 330. FIG. 3B shows the storing home. A hole 338 can be formed in the storing home 336. A cable connected with the earphone 220 can be inserted or withdrew to/from the body part 330 via the hole 338.

A cable winding-up unit for winding the cable of the earphone 220 up and a motor for rotating the cable winding-up unit can be included in the body part 330. Moreover, a button for driving the electronic motor can be exposed to exterior of the body part 330.

Figure 4:
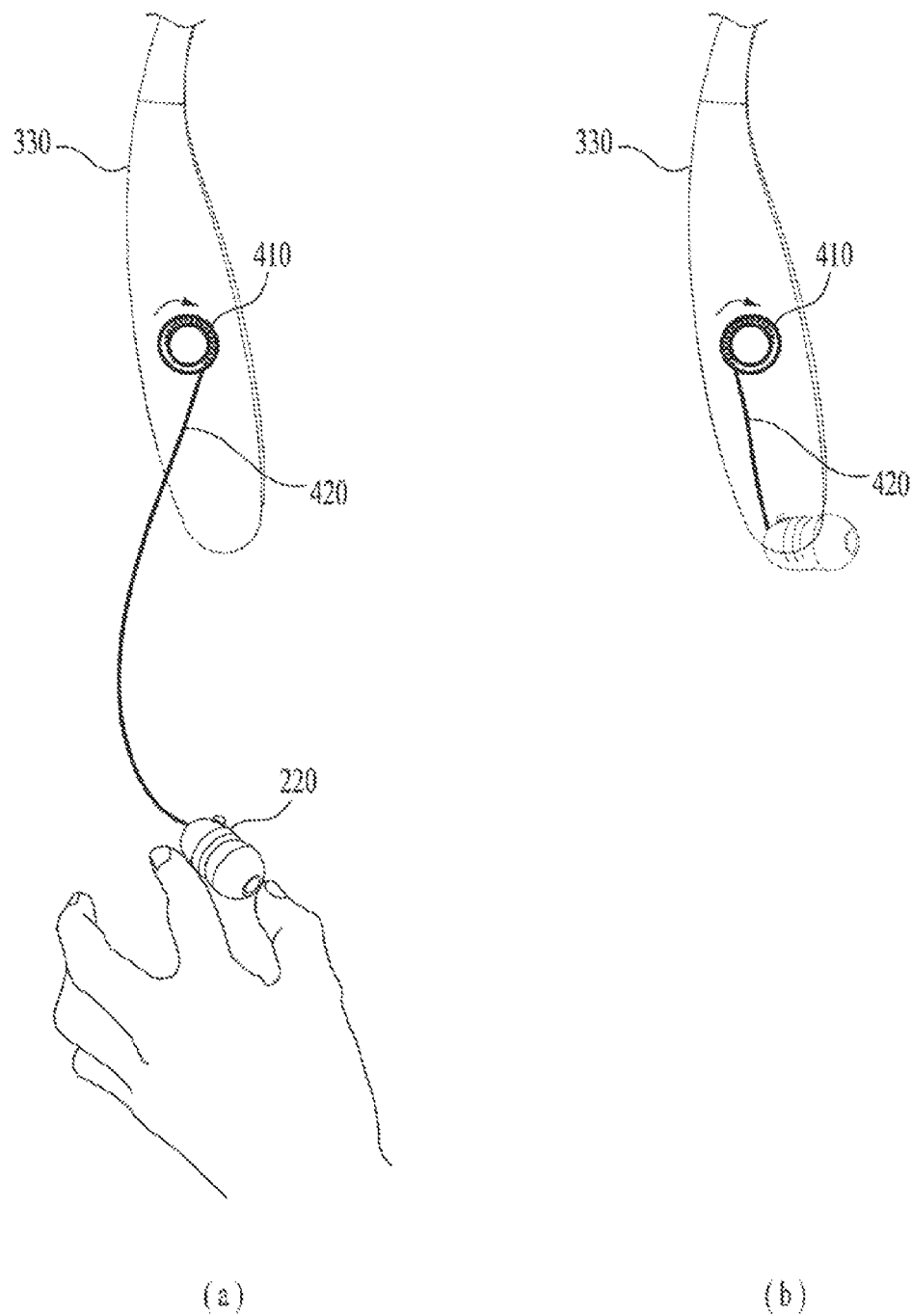
FIG. 4 is a diagram for explaining an example of winding up a cable of an earphone by rotating a cable winding-up unit.

As an example, FIG. 4 is a diagram for explaining an example of winding up a cable of an earphone by rotating a cable winding-up unit. The cable 420 connected with the earphone 220 may be connected to the cable winding-up unit 410. If a user puts an external force to the earphone to pull out the earphone 220, as depicted in FIG. 4 (a), the cable winding-up unit 410 is rotating to a first direction and the cable 420 coiled up in the cable winding-up unit 410 can be unrolled.

On the contrary, if a user input for driving the electronic motor is received, the electronic motor rotates the cable winding-up unit 410 to a second direction and can make the unrolled cable 420 to be rolled up in the cable winding-up unit 410. By doing so, when the earphone 220 is not used, the cable 420 can be stored in the body part 330, thereby reducing cumbersomeness of using the wireless receiver 200.

Figure 5:
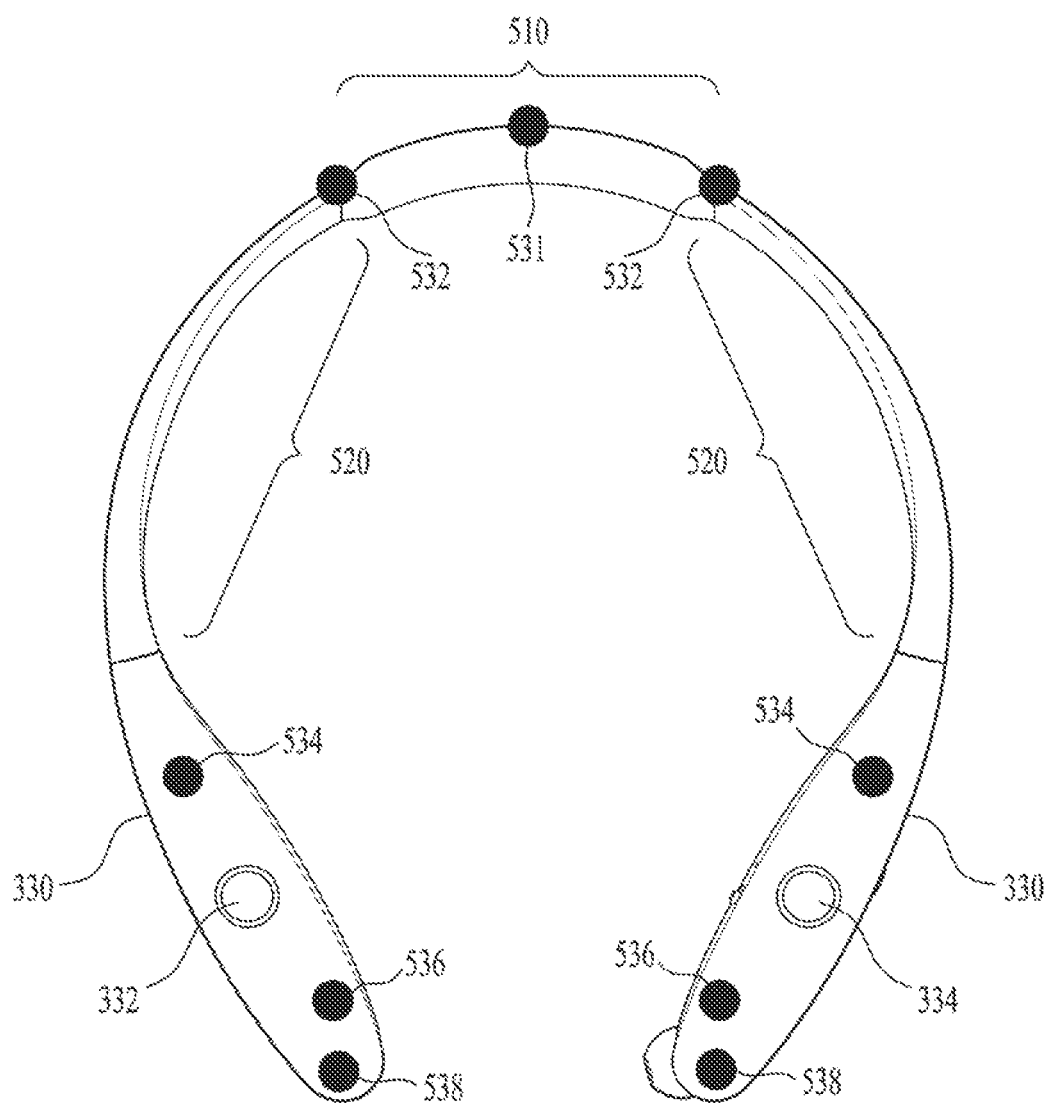
FIG. 5 is a diagram for explaining an example of sensors installed in a wireless receiver.

Various sensors can be installed in the wireless receiver 200. As an example, FIG. 5 is a diagram for explaining an example of sensors installed in the wireless receiver. First of all, such a sensor 531 as a pressure sensor, a touch sensor, a proximity sensor and the like can be installed in a flexible part 510 (i.e., a part of the band frame 310 not combined with the fixed frame 320) of the wireless receiver 200. Based on the sensor installed in the flexible part 510, whether pressure is put on the flexible part 510, whether a pointer (e.g., a finger of a user, a palm of the user or the like) is touched on the flexible part 510 and whether a pointer is approaching to the flexible part and the like can be detected.

Such a sensor 532 as a touch sensor and a proximity sensor can be installed in the boundary of the flexible part 510 and the fixed part (i.e., a part of the band frame 310 combined with the fixed frame 320). Based on the sensor 532 installed between the flexible part 510 and the fixed part 520, whether a pointer is touched between the flexible part 510 and the fixed part 520, whether a pointer is approaching between the flexible part 510 and the fixed part and the like can be detected.

Such a sensor as a gyro sensor, an acceleration sensor and the like can be included in the fixed frame 320. Based on the sensor included in the fixed frame 320, a movement of the body part 330, distortion of the body part 330 and the like can be detected.

The fixed frame 320 can further include such a sensor 536 as a magnet sensor and the like. The sensor may play a role of detecting whether the earphone is stored in the storing home 336. To this end, it will be preferable that the sensor 536 such as the magnet sensor and the like is positioned near a position in which the storing home 336 is formed. Moreover, a magnet should be installed in the earphone 220 to make a combination with the magnet sensor.

Such a sensor 538 as a touch sensor, a proximity sensor and the like can be installed in an end of the fixed frame 320. Based on the sensor 538 installed in the end of the fixed frame 320, whether the end of the fixed frame 320 is touched by a pointer, whether a pointer is approaching to the end of the fixed frame and the like can be detected.

The controller 270 can receive inputs of various gestures based on the aforementioned sensors. As an example, FIGS. 6A to 6J are diagrams for explaining various examples of a gesture input. The controller 270 can receive such an input as a gesture of moving the body part 330 to one direction, a gesture of distorting the body part 330 and the like using a gyro sensor, an acceleration sensor and the like included in the fixed frame 320. As an example, as depicted in an example of FIG. 6A, the controller 270 can receive a gesture input of pulling one of the left body part 330 and the right body part 330 or both the left body part 330 and the right body part 330 to the outside direction. Or, as depicted in an example of FIG. 6B, the controller 270 can receive a gesture input of pulling one of the left body part 330 and the right body part 330 or both the left body part 330 and the right body part 330 to the inside direction. Moreover, as depicted in an example of FIG. 6C, the controller 270 can receive a gesture input of raising up one of the left body part 330 and the right body part 330 or both the left body part 330 and the right body part 330. Or, as depicted in an example of FIG. 6D, the controller 270 can receive a gesture input of lowering down one of the left body part 330 and the right body part 330 or both the left body part 330 and the right body part 330. In addition, as depicted in an example of FIG. 6E, the controller 270 may receive a gesture input of distorting one of the left body part 330 and the right body part 330 or both the left body part 330 and the right body part 330 in a clockwise direction or a counterclockwise direction.

Figure 6A:
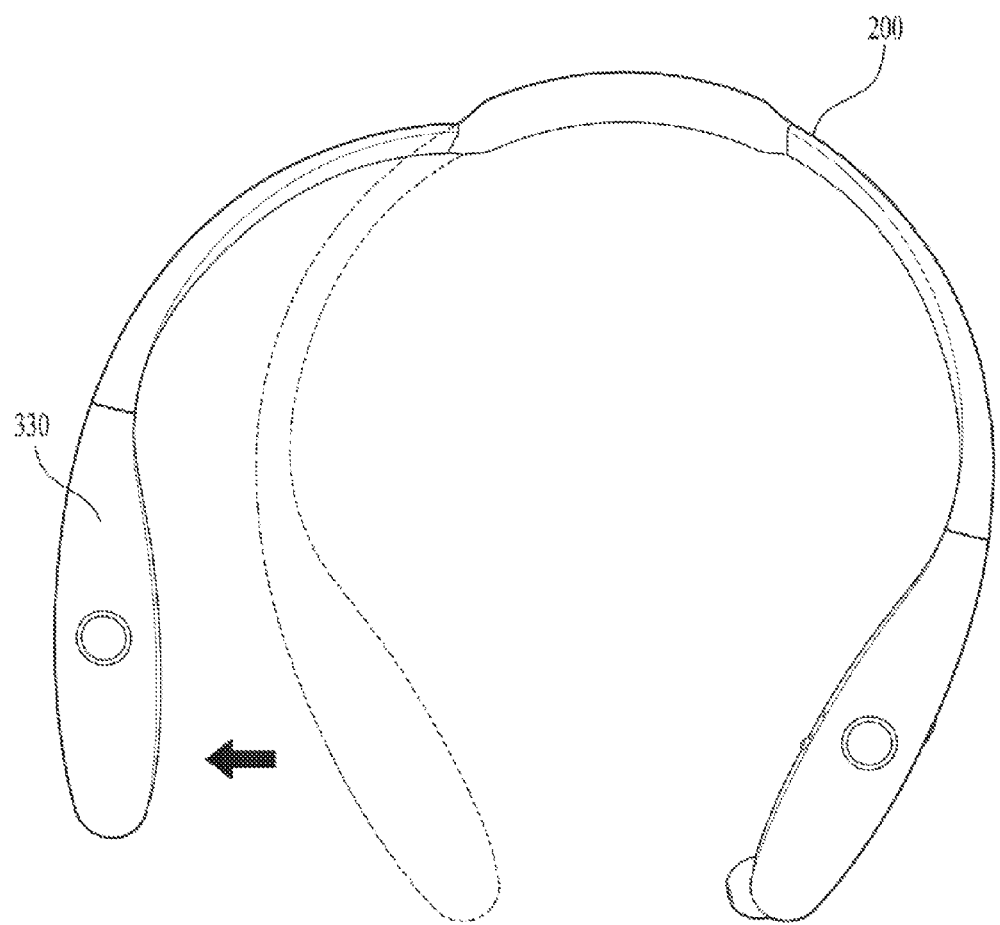
FIGS. 6A to 6J are diagrams for explaining various examples of a gesture input.
Figure 6B:
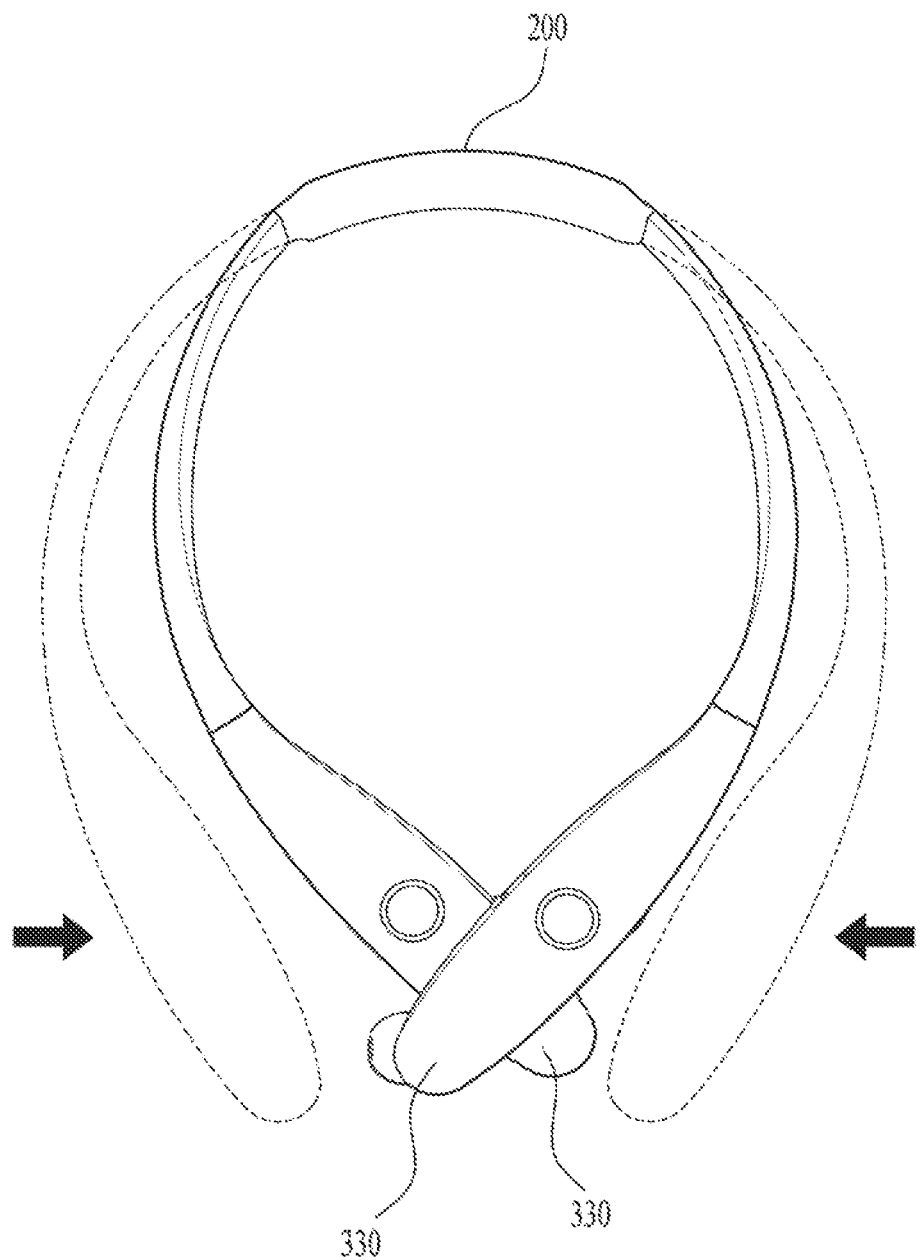
Figure 6C:
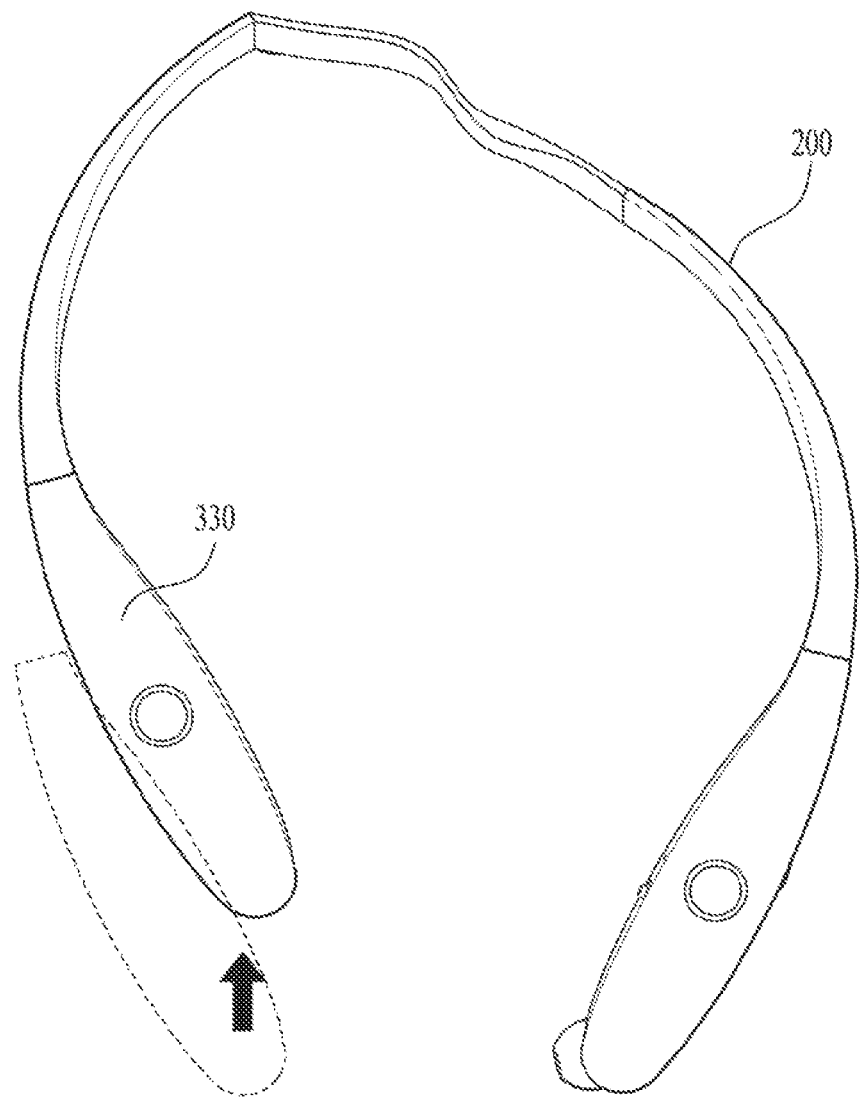
Figure 6D:
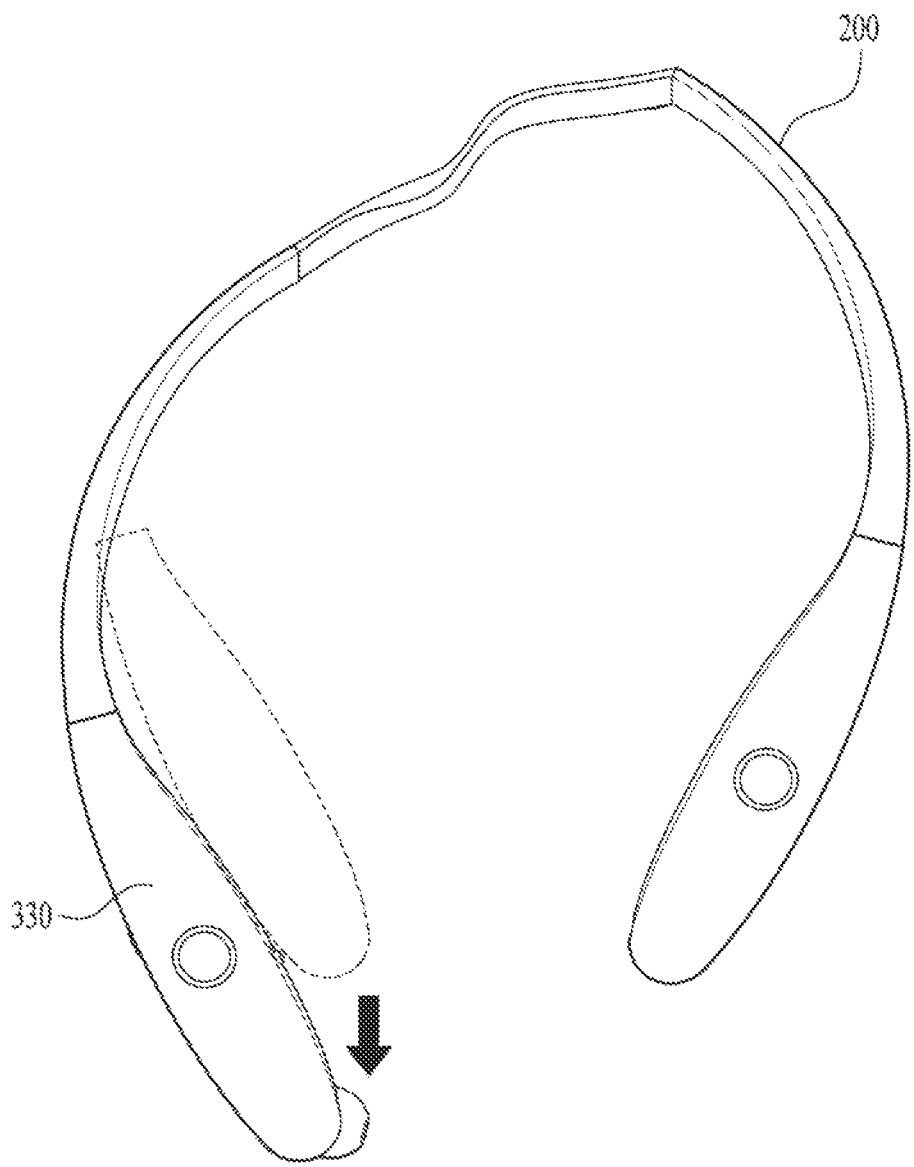
Figure 6E:
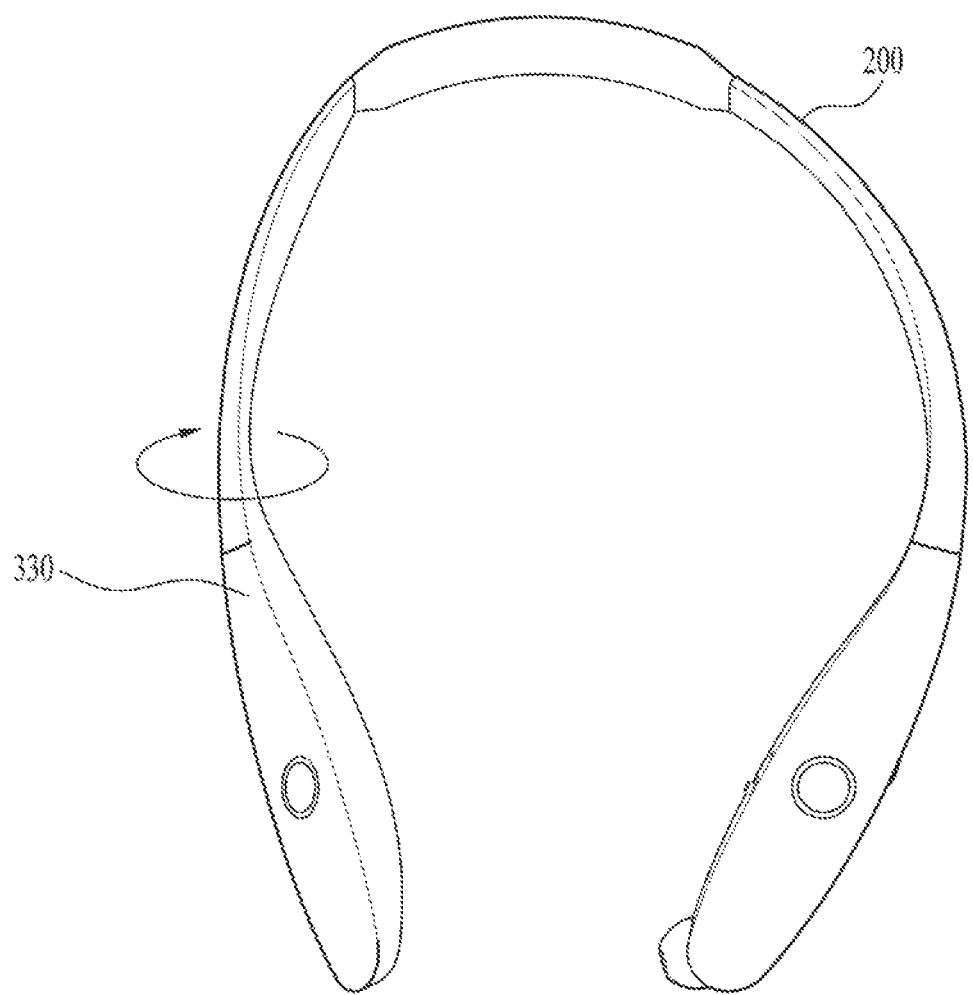
Figure 6F:
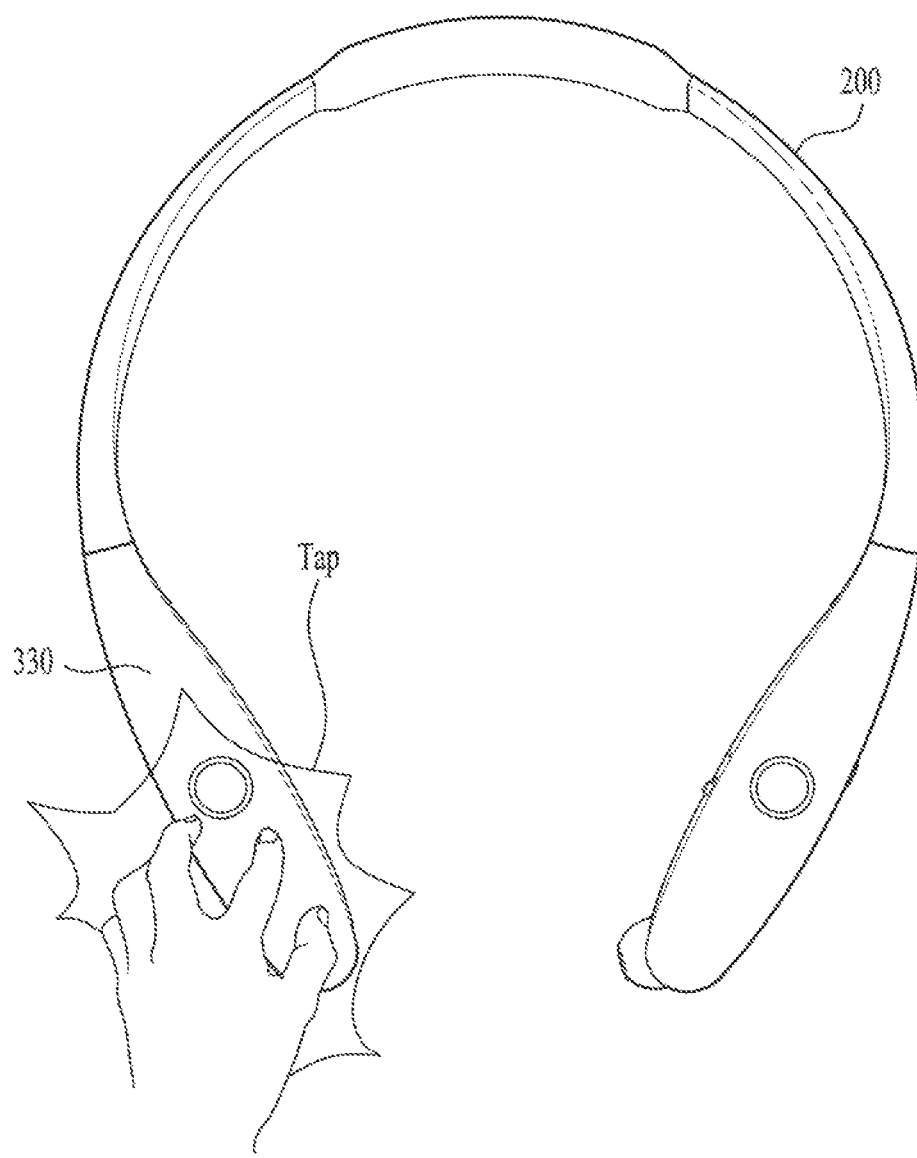

As depicted in an example of FIG. 6F, the controller 270 may receive a gesture input of tapping the body part 330 using the gyro sensor and the acceleration sensor included in the fixed frame 320.

Figure 6G:
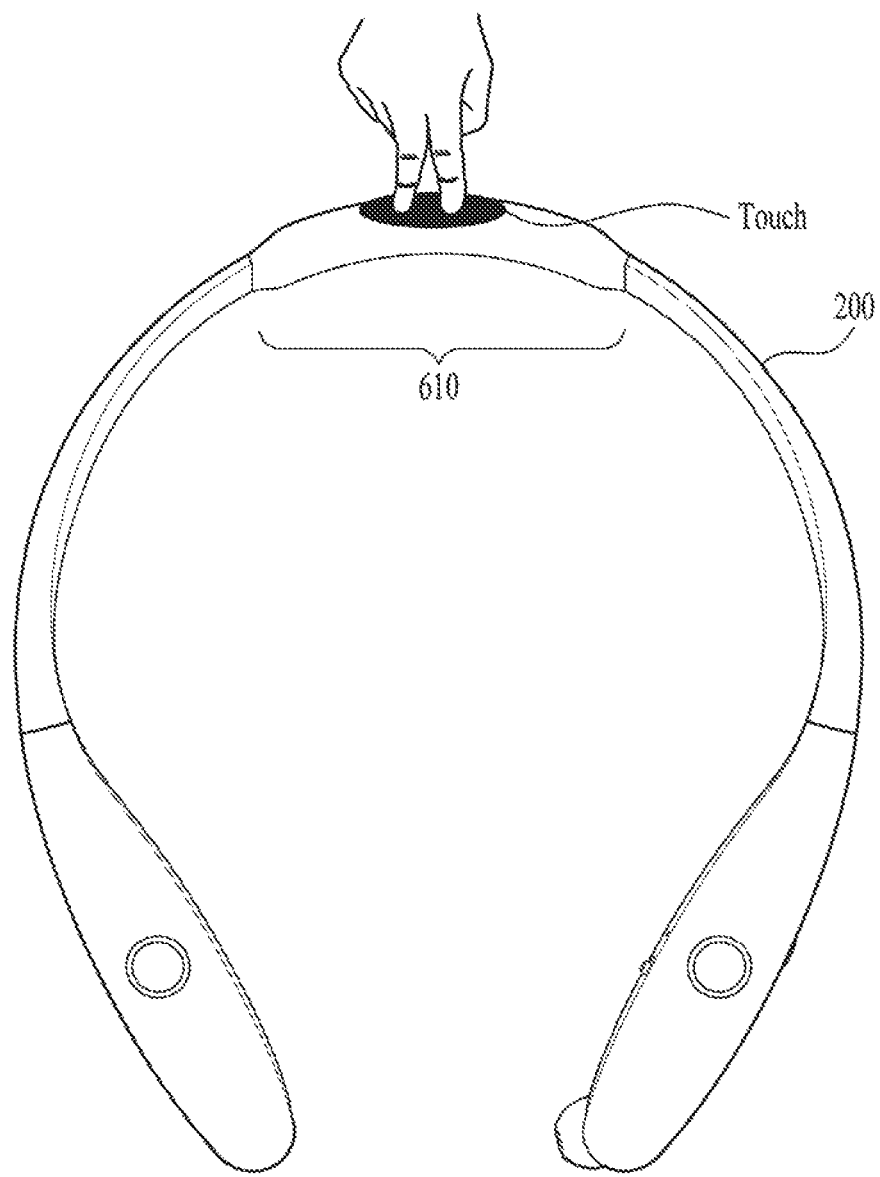

As depicted in an example of FIG. 6G, the controller 270 may receive an input of a gesture putting pressure on the flexible part 610, a gesture touching the flexible part 610 or a gesture making a pointer touch the flexible part 510 using a pressure sensor, a touch sensor, a proximity sensor and the like installed in the flexible part 610.

Figure 6H:
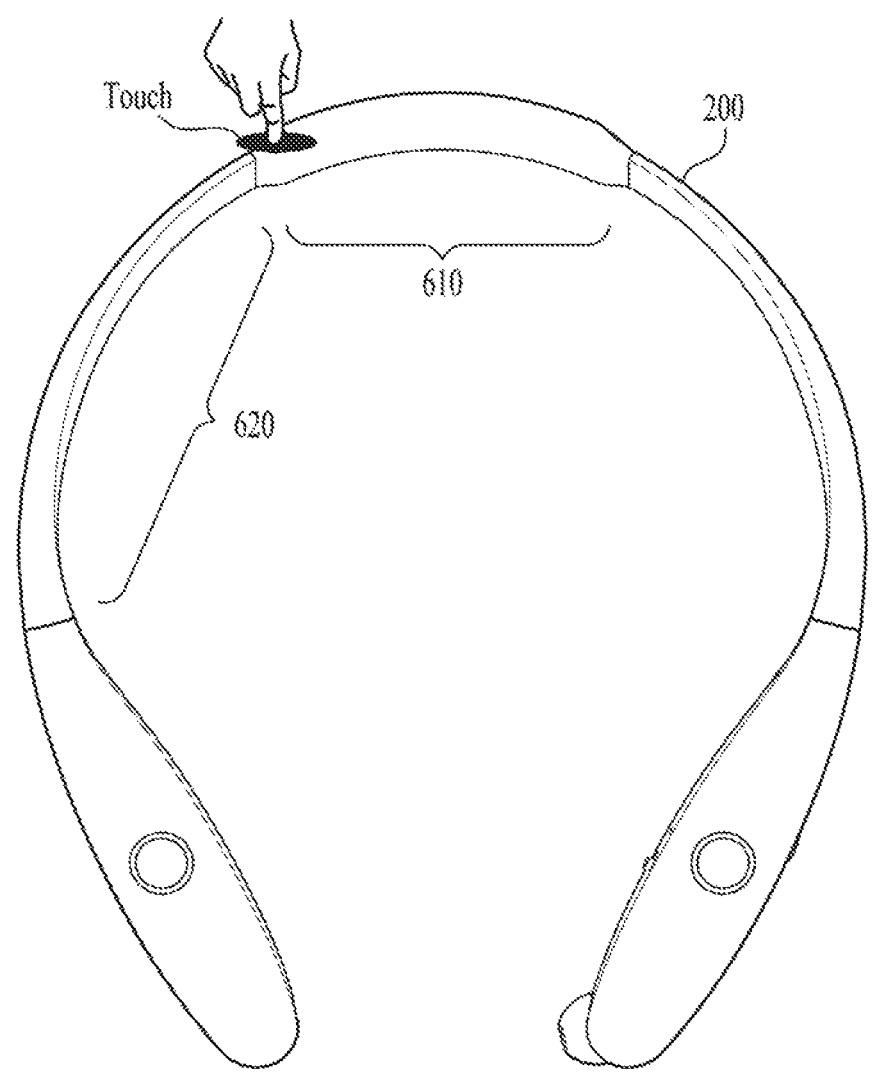

As depicted in an example of FIG. 6H, the controller 270 may receive an input of a gesture touching a boundary between the flexible part 610 and the fixed part 620 or a gesture making a pointer touch the boundary between the flexible part and the fixed part using a touch sensor, a proximity sensor and the like installed between the flexible part 610 and the fixed part 620.

Figure 6I:
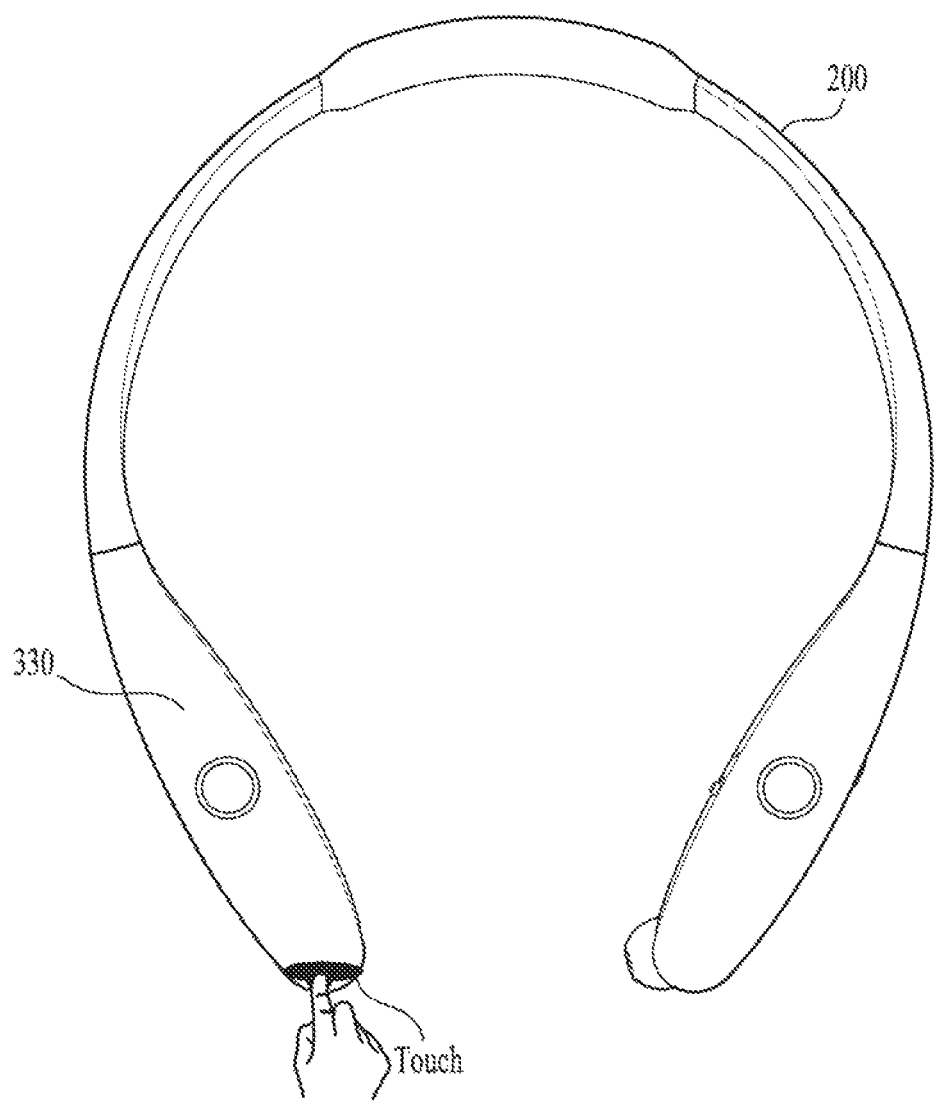

As depicted in an example of FIG. 6I, the controller 270 may receive an input of a gesture touching an end of the body part 330 or a gesture making a pointer touch the end of the body part using a touch sensor and a proximity sensor installed in the end of the body part 330.

Figure 6J:
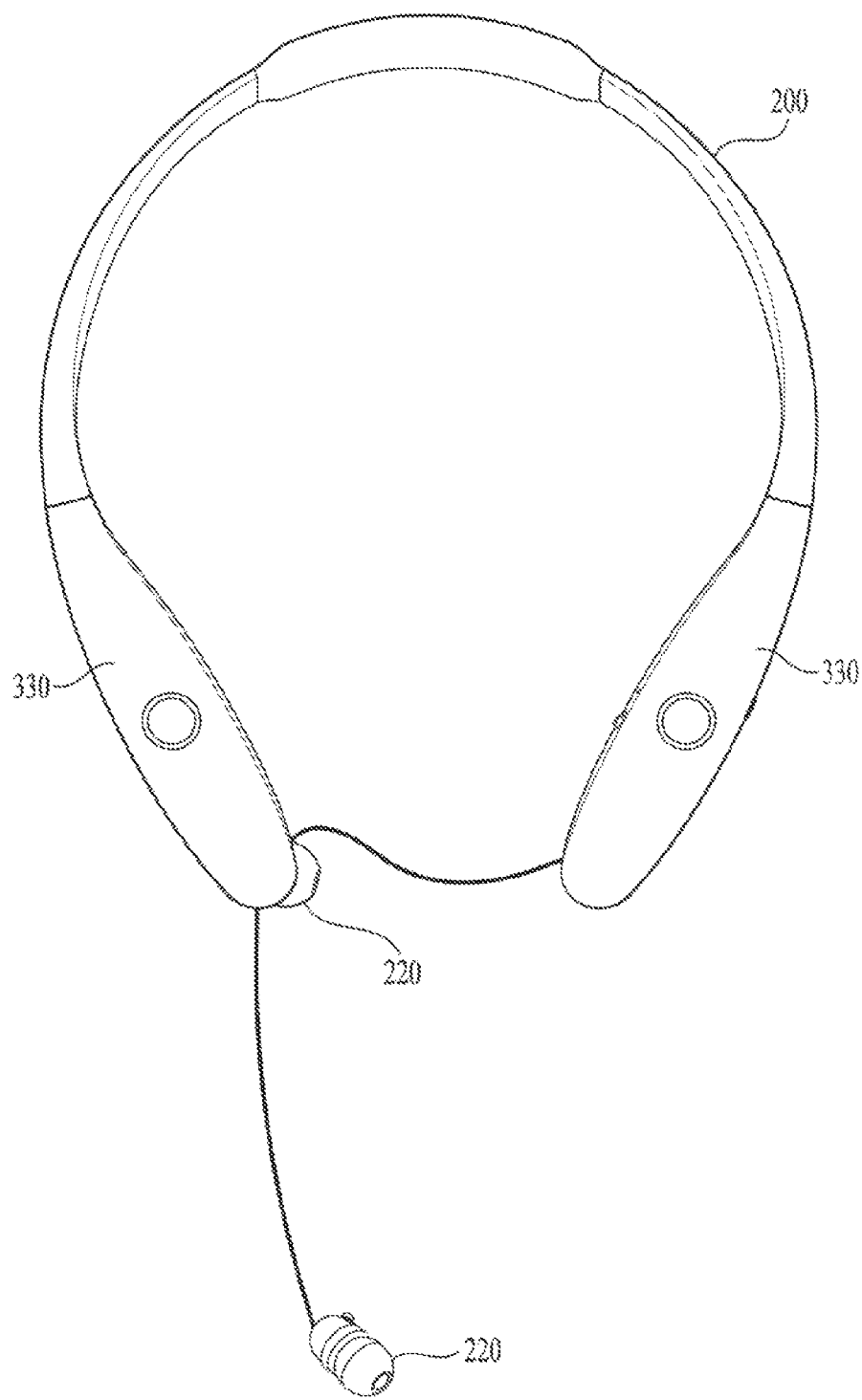

As depicted in an example of FIG. 6J, the controller 270 may receive an input of a gesture making the earphone 220 touch the storing home 336 using a magnet sensor installed in the vicinity of the storing home 336. In this case, as depicted in the example of FIG. 6J, the gesture making the earphone 200 touch the storing home 336 may correspond that one earphone 220 among a pair of the earphones touches the storing home 336 formed in the body part 330 of an opposite direction. Or, although it is not depicted, the gesture making the earphone 200 touch the storing home 336 may correspond that one earphone 220 among a pair of the earphones touches the storing home 336 formed in the body part 330 of an identical direction.

Although it is not depicted, such a sensor as a proximity sensor and the like can be included in the earphone 220 as well. The controller 270 may receive an input of a gesture pulling out the earphone 220 from ears, a gesture placing the earphone 220 into the ears and the like using the proximity sensor of the earphone 220.

As mentioned in the foregoing examples, the controller 270 can receive a gesture input of various forms using a detection signal of the sensing unit 250. Moreover, the controller 270 may receive a gesture input repeating the gestures shown in FIG. 6A to FIG. 6J more than a predetermined number and may receive a gesture input with which two or more gestures shown in FIG. 6A to FIG. 6J are combined.

The mobile terminal 100 and the wireless receiver 200 are explained in detail based on the aforementioned description. For clarity, a prefix 'first' is added to components of the mobile terminal 100 and a prefix 'second' is added to components of the wireless receiver 200.

Figure 7:
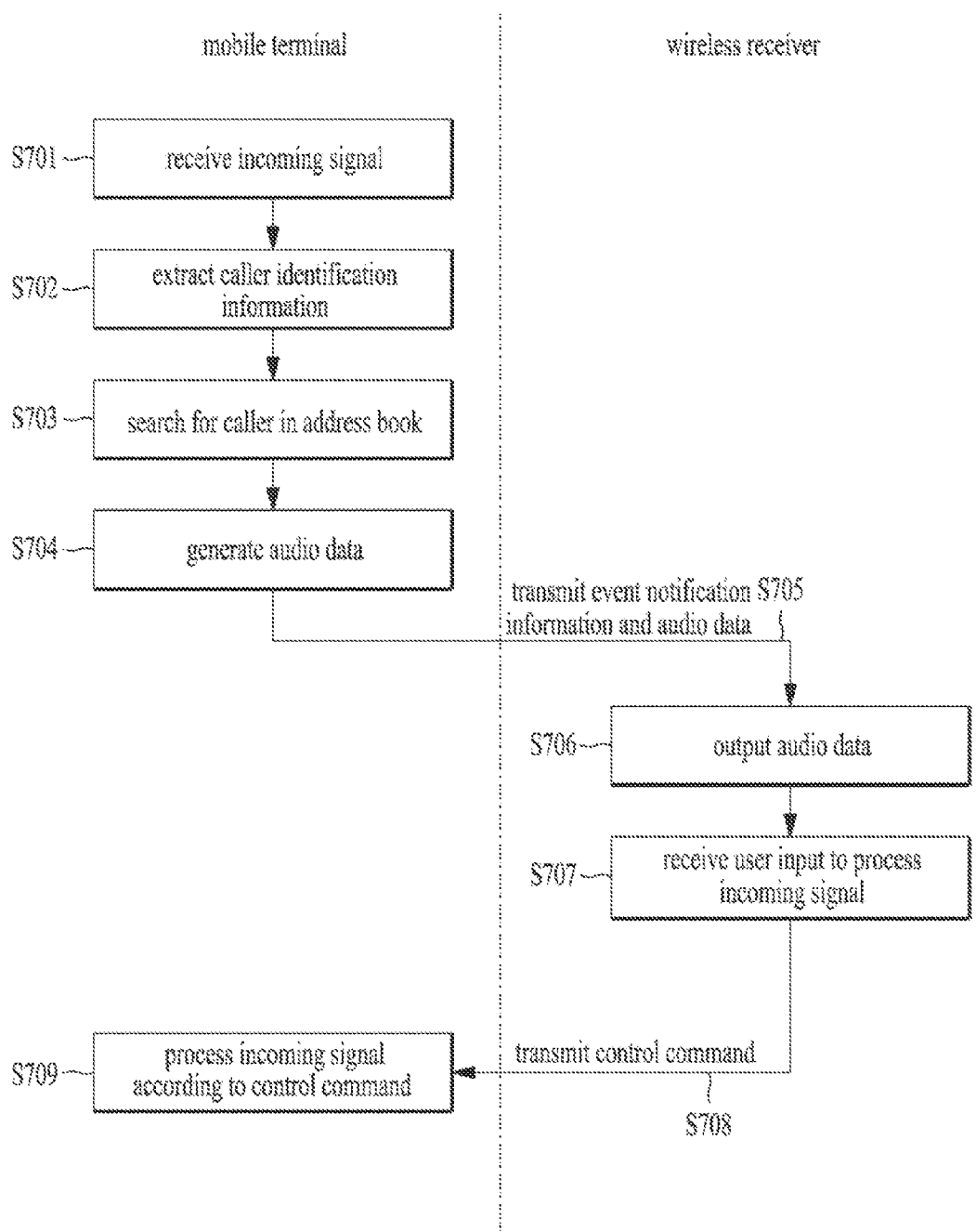
FIG. 7 is an operation flowchart for a mobile terminal and a wireless receiver according to one embodiment of the present invention.

FIG. 7 is an operation flowchart for a mobile terminal and a wireless receiver according to one embodiment of the present invention. First of all, if a first wireless communication unit 110 receives an incoming signal [S701], a first controller 180 can extract caller identification information from the incoming signal [S702]. Specifically, the first controller 180 parses a service record from the incoming signal by interpreting a code of the incoming signal and can extract the caller information from the parsed service record. In this case, the caller identification information can include a telephone number of a caller.

If the caller identification information is extracted from the incoming signal, the first controller 180 can search for a person corresponding to the caller identification information in an address book stored in a first memory 160 [S703]. Subsequently, the first controller 180 can generate audio data based on the search result [S704].

Specifically, if the person corresponding to the caller identification information is searched, the first controller 180 converts a name of the searched person to a TTS (text to speech) and can generate the audio data based on the name of the person that is converted into the TTS. In this case, the first controller 180 can generate the audio data in a manner of mixing the TTS converted name of the person with a ringtone or may generate the audio data with the TTS converted name of the person only while the ringtone is in a mute state.

If the person corresponding to the caller identification information is not searched in the address book, the first controller 180 can generate an audio data based on the telephone number of the TTS converted caller. In this case, the first controller 180 can generate the audio data in a manner of mixing the TTS converted name of the person with a ringtone or may generate the audio data with the TTS converted name of the person only while the ringtone is in a mute state.

Yet, if a telephone number corresponds to a telephone number not frequently used by a user, there is a limit for recognizing a caller by the telephone number only. Hence, if the person corresponding to the caller identification information is not found in the address book, the first controller 180 may generate an audio data by a ringtone only while omitting a process of converting the telephone number of the caller to the TTS.

If the audio data is generated, the first controller 180 can transmit the generated audio data to the wireless receiver 200 together with an event notification information [S705]. In this case, the event notification information can indicate that the mobile terminal 100 has received the incoming signal.

If the event notification information and the audio data are received from the mobile terminal 100, a second controller 270 can control the received audio data to be outputted via the earphone 220 [S706]. Yet, if a user is in a state of not wearing the earphone 220 of the wireless receiver 200, the user cannot recognize a caller who has made a call. Hence, if it is determined that at least one of a pair of the earphones 220 is put on an ear, the second controller 270 can control the audio data to be outputted at last. Moreover, the second controller 270 may control such a feedback as a vibration and the like to be outputted to inform a user that a phone call is made in the mobile terminal 100.

Information indicating whether a caller is registered in the address book can be included in the event notification information. The second controller 270 may vary a vibration pattern according to whether a caller is registered in the address book. By doing so, a user can recognize whether the caller is registered in the address book although the user is in the state of not wearing the earphone 220.

In addition, information indicating whether the caller is registered in favorites can be included in the event notification information. The second controller 270 may vary a vibration pattern according to whether the caller is registered in the favorites. By doing so, the user can easily check whether the caller is registered in the favorites using the vibration pattern of the wireless receiver 200.

FIG. 8 is a diagram for an example that an audio data outputted via a wireless receiver varies according to whether a caller is registered in an address book.

As depicted in an example of FIG. 8 (*a*), if a caller is registered in an address book with a name of 'Jane', an audio data outputted via the wireless receiver 200 may include a sound 'Jane'.

On the contrary, as depicted in an example of FIG. 8 (*b*), if a caller is not registered in the address book, an audio data outputted via the wireless receiver 200 may include a ringtone or a telephone number of the sender.

As shown in the example of FIG. 8, if a caller is registered in the address book, since the audio data outputted via the earphone 220 can include a name of the caller who has made a call, a user can conveniently check the caller who has made the call without checking a first display unit 151 of the mobile terminal 100.

If it is recognized that a phone call is made, the user can add an appropriate user input to process an incoming signal. Hence, if a user input for responding to the incoming signal or a user input for declining the incoming signal is received [S707], the second controller 270 generates a control command to process the incoming signal and can transmit the generated control command to the mobile terminal 100.

In this case, the user input for responding to the incoming signal and the user input for declining the incoming signal may correspond to an operation of a button exposed to the external of the wireless receiver 200. As an example, the user input for responding to the incoming signal corresponds to a push of a call button less than a predetermined time and the user input for declining the incoming signal may correspond to a push of the call button more than the predetermined time.

Moreover, the user input for responding to the incoming signal and the user input for declining the incoming signal may have a form of a gesture input. As an example, a prescribed gesture among the gestures mentioned earlier with reference to FIG. 6A to FIG. 6J can be defined as the user input for responding to the incoming signal and another gesture can be defined as the user input for declining the incoming signal. For instance, a gesture of putting a pair of earphones 220 on ears can be defined as the user input for responding to the incoming signal and a gesture of touching an end of the body part 330 or a gesture of taking off the earphones 220 can be defined as the user input for declining the incoming signal.

If the control command is received, the first controller 180 can respond or decline the incoming signal based on the received control command [S709].

In case of responding to the incoming signal, the first controller 180 can transmit a voice of a caller, which occurs when a telephone call is made, to the wireless receiver 200. By doing so, a user can listen to the voice of the caller using the earphone 220 of the wireless receiver although the user does not hold the mobile terminal 100 to an ear of the user.

Moreover, the second controller 270 can transmit a voice of the user inputted via a second microphone 240 to the mobile terminal 100. By doing so, the user can deliver the voice of the user to the caller without holding the microphone 240 of the mobile terminal 100 to a mouth of the user. To this end, if the user input for responding to the incoming signal is received, the second controller 270 can control the second microphone 240 to be activated.

In case of declining the incoming signal, the first controller 180 may send a message configured by a common phrase to the caller to inform the caller of a reason of not answering the phone.

The first controller 180 may send the message configured by the common phrase to the caller when the wireless receiver 200 asks the first controller to send the message configured by the common phrase only while declining the incoming signal.

The second controller 270 can determine whether to ask the mobile terminal 100 to send the message configured by the common phrase according to a gesture putting on the wireless receiver 200. As an example, when a gesture touching an end of one body part 330 corresponds to the user input for declining the incoming signal, if a gesture touching an end of one body part 330 among a pair of the body parts is inputted, the second controller 270 generates a control command simply used for declining the incoming signal. If a gesture touching an end of another body part among a pair of the body parts 330 is inputted, the second controller can generate a control command used for controlling a message to be transmitted to the caller while the incoming signal is declined.

In this case, if a plurality of common phrases are stored in a first memory 160, one of a plurality of the common phrases can be selected according to a gesture put on the wireless receiver 200. As an example, the second controller 270 can select a common phrase according to the number of tapping placed on an end of one body part among a pair of the body parts 330. As an example, if one of a pair of the body parts 330 is touched once, the second controller 270 can transmit a control command asking the mobile terminal 100 to transmit a message including a first common phrase to the mobile terminal while the incoming signal is declined. If one of a pair of the body parts 330 is touched twice, the second controller 270 can transmit a control command asking the mobile terminal 100 to transmit a message including a second common phrase to the mobile terminal while the incoming signal is declined.

Yet, the user input for declining the incoming signal may be non-limited by the aforementioned gesture and may correspond to an operation of a physical button, one of the gestures mentioned earlier with reference to FIG. 6A to FIG. 6J or combination thereof.

According to an example shown in the steps S703 to S705, if an event occurs, audio data is generated and event notification information and the audio data are transmitted to the wireless receiver 200. On the contrary, if the wireless receiver 200 asks the first controller 180 to transmit the audio data, the first controller 180 may transmit the audio data to the wireless receiver 200.

Specifically, if the wireless receiver 200 receives an appropriate user input, the second controller 270 can ask the mobile terminal 100 to transmit audio data. As an example, if a user input pushing a button (e.g., a playback control button, a call button, a volume button or the like) of the wireless receiver 200 is received or if the gesture input mentioned earlier with reference to FIG. 6A to FIG. 6J is received, the controller 270 can ask the mobile terminal 100 to transmit the audio data. If the audio data is received in response to the request, the second controller 270 can output the audio data, which is received via the earphone 220. By doing so, a user can control the audio data to be outputted when the user intends to check caller information only.

As a different example, the first controller 180 transmits a first audio data to enable the wireless receiver 200 to preferentially output the first audio data. And then, if the wireless receiver 200 makes a request for a second audio data, the first controller may transmit the second audio data to the wireless receiver 200. As an example, if the first audio data is generated based on a ringtone and the second audio data is generated based on a TTS converted person (or a TTS converted telephone number), the wireless receiver 200 outputs an initial ringtone (i.e., the first audio data). If an appropriate input of a user is received, the wireless receiver 200 can output information on the TTS converted person (or the TTS converted telephone number) (i.e., the second audio data) at last. In this case, the user input used for outputting the second audio data may correspond to a push of a button (e.g., a playback control button, a call button, a volume button or the like) or a gesture input mentioned earlier with reference to FIG. 6A to FIG. 6J.

The mobile terminal 100 may determine whether to make an audio data to be outputted in the wireless receiver 200 according to whether a user is putting on earphones 220. As an example, if the user is not putting on the earphones 220, the controller 180 of the mobile terminal 100 can output audio (e.g., at least one of a ringtone, a name of a TTS converted sender and a TTS converted telephone number) by itself via the audio output module 152 instead of transmitting the audio data to the wireless receiver 200. On the contrary, if the user is putting on the earphones 220, the first controller 180 of the mobile terminal 100 can control the audio data to be outputted via the earphones 220 in a manner of transmitting the audio data to the wireless receiver 200.

To this end, the wireless receiver 200 can transmit information indicating whether the user is putting on the earphones 220 to the mobile terminal 100 periodically, according to a request of the mobile terminal 100, or in case that wearing and taking off the earphones are detected.

In this case, when the TTS converted name of the caller (or the TTS converted telephone number) is outputted via the audio output module 152 (e.g., a speaker) of the mobile terminal 100, since persons near the mobile terminal can recognize a person who has made a call, privacy of the user may be invaded. Hence, if the user is not putting on the earphones 220, the first controller 180 may control the TTS converted name of the caller (or the TTS converted telephone number) to be outputted via the audio output module 152 when an appropriate user input is received only. In this case, a user input for triggering output of the TTS converted name of the caller (or the TTS converted telephone number) may correspond to a push of a button (e.g., a playback control button, a call button, a volume button or the like) of the wireless receiver 200, a push of a button of the mobile terminal 100 or a touch input on the mobile terminal 100.

Unlike a case of outputting audio data via a speaker, when the audio data is outputted via the earphones 220, privacy of the user may not be invaded. Hence, if the user is putting on the earphones 220, the controller 270 may control the audio data to be immediately outputted via the earphones 220 without waiting for an appropriate user input. As a different example, the second controller 270 just outputs a first audio data. If an appropriate input of the user is received, the second controller 270 can control a second audio data to be outputted. If the first audio data is generated based on a ringtone and the second audio data is generated based on the TTS converted person (or the TTS converted telephone number), the wireless receiver 200 initially outputs the ringtone (i.e., the first audio data) via the earphones 220. If the appropriate user input is received, the wireless receiver can output information on the TTS converted person (or the TTS converted telephone number) (i.e., the second audio data) via the earphone 200 at last. In this case, the user input used for outputting the second audio data may correspond to a push of a button (e.g., a playback control button, a call button, a volume button or the like) of the wireless receiver 200 or the gesture input mentioned earlier with reference to FIG. 6A to FIG. 6J.

When the mobile terminal 100 receives a message, the wireless receiver 200 may outputs information on a sender who has transmitted the message. Regarding this, it shall be described in detail with reference to FIG. 9 in the following.

Figure 9:
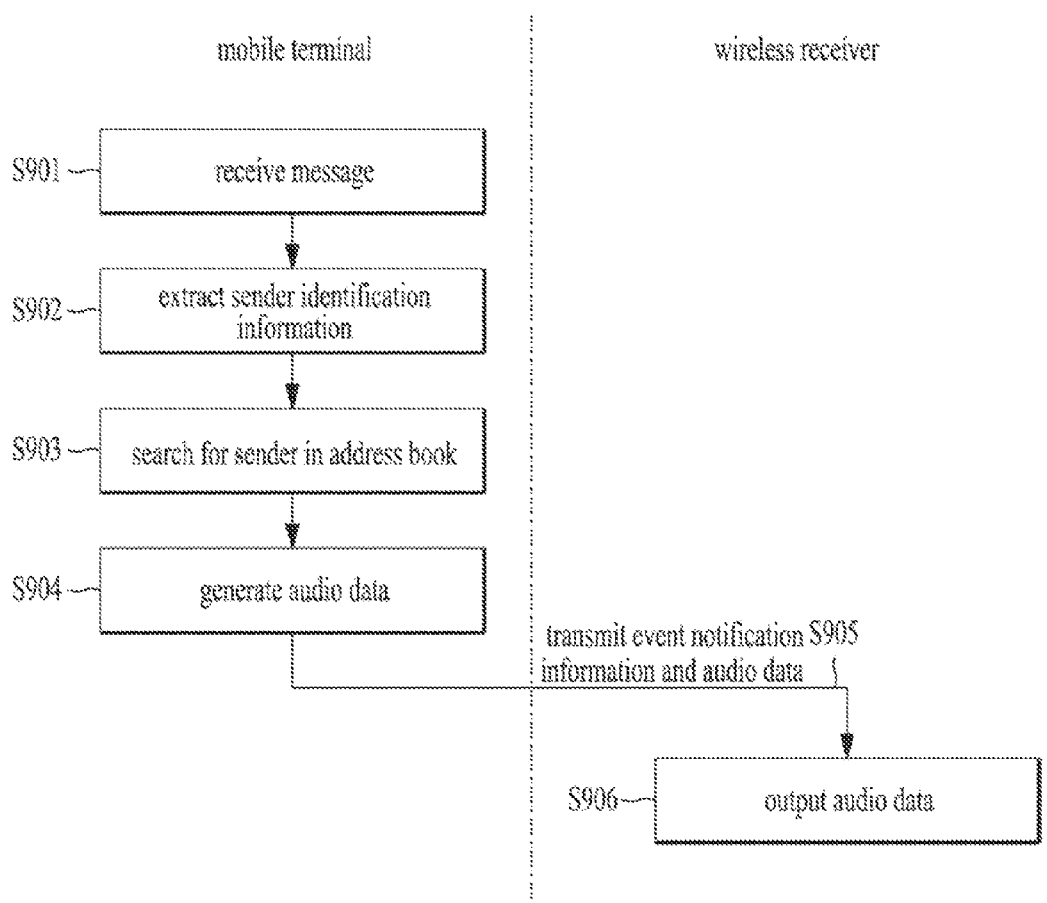
FIG. 9 is an operation flowchart for a mobile terminal and a wireless receiver according to one embodiment of the present invention.

FIG. 9 is an operation flowchart for a mobile terminal and a wireless receiver according to one embodiment of the present invention. First of all, if the first wireless communication unit 110 receives a message [S901], the first controller 180 can extract sender identification information who has transmitted the message from the message [S902]. In this case, the message can include a text message (e.g., an SMS, an LMS, an MMS and the like), an instant message, an e-mail and the like and the sender identification information can include a telephone number of the sender, an ID (e.g., ID of the sender to use an instant messaging service) of the sender, e-mail and the like.

If the sender identification information is extracted from the message, the first controller 180 can search for a person corresponding to the sender identification information in an address book stored in the memory 160 [S903]. Subsequently, the first controller 180 can generate audio data based on a search result [S904].

Specifically, if the person corresponding to the sender identification information is searched, the first controller 180 converts a name of the searched person into TTS (text to speech) and can generate audio data based on the TTS converted name of the person and message content.

If the person corresponding to the sender identification information is not searched out in the address book, the first controller 180 can generate audio data in a manner of combining the TTS converted telephone number of the sender with the message content.

If the audio data is generated, the first controller 180 can transmit the generated audio data to the wireless receiver 200 together with event notification information [S905]. In this case, the event notification information can indicate that the mobile terminal 100 has received the message.

If the event notification information and the audio data are received from the mobile terminal 100, the second controller 270 can control the received audio data to be outputted via the earphones 220 [S906]. In this case, the second controller 270 can control the audio data to be outputted when it is determined that the earphones 220 are placing into the ears of the user only. Moreover, the second controller 270 can control such a feedback as a vibration and the like to be outputted to inform the user that the mobile terminal 100 has received the message.

In this case, information indicating whether a sender is registered in the address book can be included in the event notification information. The second controller 270 may vary a vibration pattern according to whether a sender is registered in the address book. By doing so, a user can recognize whether the sender is registered in the address book although the user is in the state of not wearing the earphone 220.

In addition, information indicating whether the sender is registered in favorites can be included in the event notification information. The second controller 270 may vary a vibration pattern according to whether the sender is registered in the favorites. By doing so, the user can easily check whether the sender is registered in the favorites using the vibration pattern of the wireless receiver 200.

In addition, information indicating a message type can be included in the event notification information. The second controller 270 can control the vibration patterns different from each other to be outputted according to the message type received by the mobile terminal 100. As an example, if an e-mail, a text message and an instant message are received, the vibration patters different from each other can be outputted, respectively.

FIG. 10 is a diagram for an example that an audio data outputted via a wireless receiver varies according to whether a sender is registered in an address book.

As depicted in an example of FIG. 10 (*a*), if a sender is registered in an address book with a name of 'Jane', an audio data outputted via the wireless receiver 200 may include a sound 'Jane', time on which a message is received and content of the received message.

On the contrary, as depicted in an example of FIG. 10 (*b*), if a sender is not registered in the address book, an audio data outputted via the wireless receiver 200 may include a telephone number of the sender, the time on which the message is received and the content of the received message.

As shown in the example of FIG. 10, if a sender is registered in the address book, since the audio data outputted via the earphone 220 can include a name of the sender who has transmitted the message, a user can conveniently check the sender who has transmitted the message without checking the first display unit 151 of the mobile terminal 100.

If a predetermined user input is received via the wireless receiver 200 while the audio data is outputted, the second controller 270 can transmit a control command asking the mobile terminal 100 to delete a message, a control command asking the mobile terminal to register the message as a spam message and a control command asking the mobile terminal to transmit a message including a predetermined common phrase in response to the received message to the mobile terminal 100.

As an example, if a gesture of taking off one of a pair of earphones 220 worn on the user occurs, the second controller 270 can generate a control command for asking the mobile terminal to delete a message and if a gesture of taking off all of the pair of earphones 220 worn on the user occurs, the second controller 270 can generate a control command for asking the mobile terminal to register a telephone number of a sender who has transmitted the message as a spam number.

In addition, if a gesture input touching an end of one body part 330 is received, the second controller 270 can generate a control command for asking the mobile terminal to transmit a message including a predetermined common phrase in response to the received message.

If a plurality of common phrases are stored in a first memory 160, one of a plurality of the common phrases can be selected according to a gesture put on the wireless receiver 200. As an example, the second controller 270 can select a common phrase according to the number of tapping placed on an end of one body part among a pair of the body parts 330. As an example, if one of a pair of the body parts 330 is touched once, the second controller 270 can transmit a control command asking the mobile terminal 100 to transmit a message including a first common phrase to the mobile terminal. If one of the pair of the body parts 330 is touched twice, the second controller 270 can transmit a control command asking the mobile terminal 100 to transmit a message including a second common phrase to the mobile terminal.

Yet, the user input used for deleting a message, registering the message as spam and replying to the message may be non-limited by the aforementioned gesture and may correspond to an operation of a physical button, one of the gestures mentioned earlier with reference to FIG. 6A to FIG. 6J or combination thereof.

As mentioned in the foregoing description with reference to FIG. 7 to FIG. 9, when the mobile terminal 100 receives an incoming signal or a message, the wireless receiver 200 can output audio data including identification information of a caller or a sender. By doing so, a user wearing the wireless receiver 200 can easily check the caller who has made a call or the sender who has transmitted the message without checking the mobile terminal 100 (specifically, the first display unit 151).

As depicted in the example of FIG. 7, the wireless receiver 200 can be used for the purpose of answering a call made to the mobile terminal 100. Moreover, the wireless receiver 200 can be used for the purpose of making a call via the mobile terminal 100. Regarding this, it shall be described in detail with reference to FIG. 11 in the following.

Figure 11:
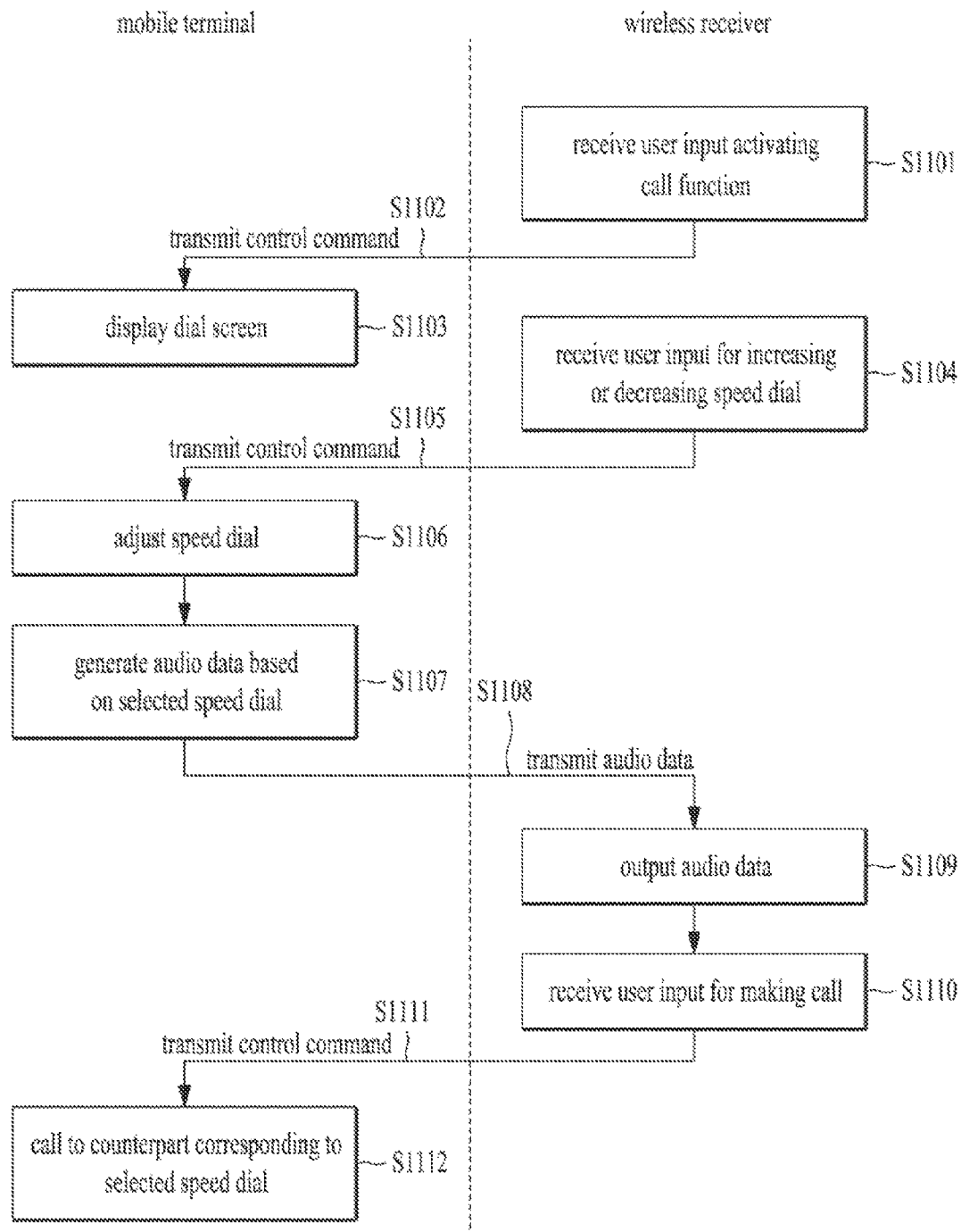
FIG. 11 is a flowchart for one embodiment of a mobile terminal and a wireless receiver according to the present invention.

FIG. 11 is a flowchart for one embodiment of a mobile terminal and a wireless receiver according to the present invention. First of all, if a user input for activating a calling function is received via the wireless receiver 200 [S1101], the second controller 270 generates a control command for activating the calling function of the mobile terminal 100 and can transmit the generated control command to the mobile terminal 100 [S1102]. In this case, the user input for activating the calling function may correspond to a push (e.g., pushing a call button) of a button exposed to the body part 330, one of various gesture inputs mentioned earlier with reference to FIG. 6A to FIG. 6J or combination thereof.

If the control command is received from the wireless receiver 200, the first controller 180 can control a dial screen used for making a call to be displayed [S1103].

A user can determine a counterpart to make a call by operating the wireless receiver 200 while the dial screen is displayed. Yet, since the wireless receiver does not provide a number key pad including numbers 0 to 9 to the user, inputting a telephone number including more than 7 to 8 numbers using the wireless receiver may cause inconvenience of the user. Hence, the user may select a speed dial of the counterpart to make a call via the wireless receiver 200.

Hence, if a user input for increasing or decreasing the speed dial via the wireless receiver 200 is received [S1104], the second controller 270 generates a control command for increasing or decreasing the speed dial and can transmit the generated control command to the mobile terminal 100.

If the control command is received from the wireless receiver 200, the first controller 180 increases or decreases the speed dial according to the control command and can control information of the counterpart corresponding to the current speed dial to be displayed [S1106]. If the speed dial is modified, the first controller 180 converts information of the counterpart corresponding to the modified speed dial into TTS and can generate audio data based on the TTS converted information of the counterpart [S1107]. The first controller 180 transmit the generated audio data to the wireless receiver 200 [S1108] and the second controller 270 can output the received audio data via the earphones 220 [S1109]. By doing so, if the user puts on the earphones 220, the user can recognize the currently selected counterpart without checking the information displayed in the mobile terminal 100.

Subsequently, if a user input for making a call via the wireless receiver 200 is received [S1110], the second controller 270 generates a control command for making a call and can transmit the generated control command to the mobile terminal 100 [S1111].

If the control command is received from the wireless receiver 200, the first controller 180 can make a call to the counterpart corresponding to the current speed dial [S1112]. Embodiment of making call using the wireless receiver 200 is explained in detail with reference to drawings in the following.

FIGS. 12A and 12B are diagrams for explaining an embodiment of making a call using a wireless receiver. If a user input for activating a calling function is inputted via the wireless receiver 200, the second controller 270 generates a control command for activating the calling function and can transmit the generated control command to the mobile terminal 100. In this case, as depicted in an example of FIG. 12A (a), the user input for activating the calling function may correspond to a push (e.g., pushing a call button) of a button exposed to the external of the wireless receiver 200, a gesture input among various gesture inputs mentioned earlier with reference to FIG. 6A to FIG. 6J or combination thereof.

If the user input for activating the calling function is received from the wireless receiver 200, as depicted in FIG. 12A (*a*), the first controller 180 can control a dial screen to be displayed.

Subsequently, a user can select a speed dial by operating the wireless receiver 200. As an example, as depicted in FIGS. 12B (*a*) and (*b*), a gesture of pulling one of a left body part 330 and a right body part 330 to an outside direction (or inside direction) may correspond to a user input for increasing the speed dial and a gesture of pulling another one of the left body part 330 and the right body part 330 to the outside direction (or inside direction) may correspond to a user input for decreasing the speed dial.

Information of the counterpart corresponding to a currently selected speed dial can be displayed in the first display unit 151 according to the gesture for increasing or decreasing the speed dial. As an example, when no information on the counterpart is displayed in a dial pad, if a user input for increasing the speed dial is received, as depicted in FIG. 12B (a), the information on the counterpart corresponding to a speed dial 1 can be displayed. In this case, the wireless receiver 200 can output audio data including the information (e.g., a name of the counterpart corresponding to the speed dial 1) on the counterpart corresponding to the speed dial 1. Although it is not depicted, if a gesture for increasing the speed dial is further inputted while the information on the counterpart corresponding to the speed dial 1 is displayed, information on a counterpart corresponding to a speed dial 2 can be displayed. In this case, the wireless receiver 200 can output audio data including the information (e.g., a name of the counterpart corresponding to the speed dial 1) on the counterpart corresponding to the speed dial 1.

Moreover, if a gesture for decreasing the speed dial is inputted while the information on the counterpart corresponding to the speed dial 1 is displayed, as depicted in FIG. 12B (b), information on the counterpart corresponding to the last speed dial (speed dial 10 in FIG. 12B (b)) can be displayed. In this case, the wireless receiver 200 can output audio data including the information (e.g., a name of the counterpart corresponding to the speed dial 1) on the counterpart corresponding to the last speed dial. Although it is not depicted, if a gesture for decreasing the speed dial is inputted while the information on the counterpart corresponding to the speed dial 10 is displayed, information on a counterpart corresponding to a speed dial 9 can be displayed.

Besides the example depicted in FIG. 12B, a gesture of pulling one of a pair of body parts 330 to outside (or inside) direction may be allocated as a user input for increasing the speed dial and a gesture of pulling the body parts 330 to inside (or outside) direction may be allocated as a user input for decreasing the speed dial. As a different example, a gesture of distorting one of a left body part 330 and a right body part 330 can be allocated as a user input for increasing the speed dial and a gesture of distorting another one of the left body part 330 and the right body part 330 can be allocated as a user input for decreasing the speed dial.

Except a gesture input, it is apparent that an operation of a button exposed to the external of the wireless receiver 200 is utilized as a user input for increasing the speed dial and a user input for decreasing the speed dial.

Subsequently, if a user input for making a call is inputted via the wireless receiver 200, the mobile terminal 100 can make a call to a counterpart corresponding to a currently selected speed dial. As an example, as depicted in FIG. 12A (b), when information on a counterpart corresponding to a speed dial 1 is displayed, if the user input for making a call is received, the first controller 180 can make a call to the counterpart corresponding to the speed dial 1. In this case, as depicted in FIG. 12A (b), the user input for making a call may correspond to a push (e.g., pushing a call button) of a button exposed to the external of the wireless receiver 200, one of various gesture inputs mentioned earlier with reference to FIG. 6A to FIG. 6J or combination thereof.

The wireless receiver 200 according to the present invention asks the mobile terminal 100 to transmit audio data for specific information. If the audio data is received in response to the request, the wireless receiver can output the received audio data. Regarding this, it shall be described in detail with reference to FIG. 13 in the following.

Figure 13:
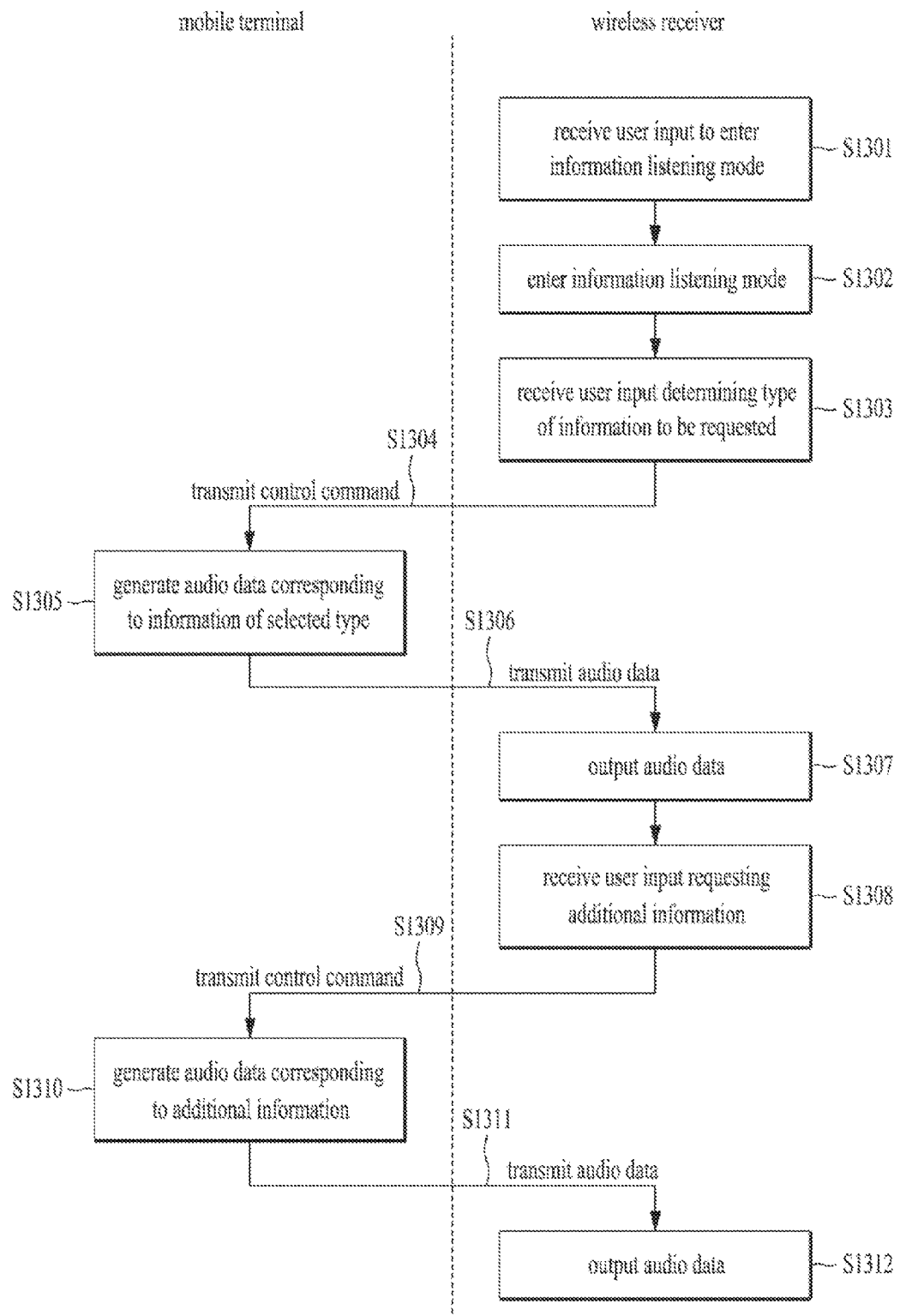
FIG. 13 is an operation flowchart for a mobile terminal and a wireless receiver according to one embodiment of the present invention.

FIG. 13 is an operation flowchart for a mobile terminal and a wireless receiver according to one embodiment of the present invention. First of all, if a predetermined user input is received via the wireless receiver 200 [S1301], the second controller 270 can control the wireless receiver 200 to enter an information listening mode used for listening data stored in the mobile terminal 100 [S1302]. In this case, a user input for configuring the wireless receiver 200 to enter the information listening mode may correspond to a push of a button exposed to the external of the wireless receiver 200, one of various gesture inputs mentioned earlier with reference to FIG. 6A to FIG. 6J or combination thereof.

When the wireless receiver 200 has entered the information listening mode, a user can selectively input one of various user inputs to determine a type of information intended to listen. By doing so, if the user input for selecting the type of the information intended to listen is received [S1303], the second controller 270 generates a control command to request audio data on the selected information type and can transmit the generated control command to the mobile terminal 100 [S1304].

In this case, the information type requested to the mobile terminal 100 by the wireless receiver 200 may include weather information, time information, unchecked event information and the like. In this case, the unchecked event may correspond to an unchecked message, a missed call unchecked by a user and the like.

Moreover, a user input for requesting information of a specific type may correspond to an operation of physical buttons installed in the wireless receiver 200, one of various gesture inputs mentioned earlier with reference to FIG. 6A to FIG. 6J or combination thereof. In order to make a request for provision of information different from each other according to a type of user input, configuration data in which the kind of information to be requested is matched with the type of the user input can be stored in the second memory 260.

If the control command is received from the wireless receiver 200, the first controller 180 generates audio data in a manner of converting the information requested by the wireless receiver 200 into TTS [S1305] and can transmit the generated audio data to the wireless receiver 200 [S1306].

Specifically, if the information requested by the wireless receiver 200 correspond to weather information, the TTS converted audio data includes audio information on current weather. In addition, the audio data can further include current location information or audio information on future weather (e.g., weather of tomorrow or weather of this week).

If the information requested by the wireless receiver 200 corresponds to time information, the TTS converted audio data can include audio information on current time.

If the information requested by the wireless receiver 200 corresponds to unchecked event information, the TTS converted audio data can include information on the number of unchecked event (e.g., the number of missed call or the number of unread message) and information on a counterpart causing the unchecked event.

If the audio data is received, the second controller 270 can control the received audio data to be outputted via the earphones 220 [S1307].

If there exist additional data related to the information of the specific type, a user listens to the information of the specific type and may be then able to input a user input for additionally requesting the additional information. By doing so, if the user input for requesting the additional information is received [S1308], the second controller 270 generates a control command for requesting audio data on the additional information and can transmit the generated control command to the mobile terminal 100 [S1309].

If the information of the specific type corresponds to time information, additional information capable of being added to the time information can include a current date, schedule information configured within a prescribed time from current time or alarm information.

If the information of the specific type corresponds to unchecked message information, additional information capable of being added to the unchecked message information can include unchecked message content.

If the control command is received from the wireless receiver 200, the first controller 180 generates audio data in a manner of converting the additional information added to the specific type into TTS [S1310] and can transmit the generated audio data to the wireless receiver 200 [S1311].

If the audio data is received, the second controller 270 can control the received audio data to be outputted via the earphones 220 [S1312]. Example of outputting the information of the specific type via the wireless receiver 200 is explained in detail with reference to FIG. 14 in the following.

FIGS. 14A to 14D are diagrams for examples of outputting information of a specific type via a wireless receiver.

If a predetermined user input is received, the second controller 270 can control the wireless receiver 200 to be configured in an information listening mode. As an example, as depicted in FIG. 14A (*a*), if a gesture of tapping one of a pair of the body parts 330 twice is inputted, the second controller 270 sets the wireless receiver 200 to the information listening mode and may wait for reception of a user input used for determining information of specific type.

Subsequently, if the user input used for selecting the information of specific type is received, the second controller 270 generates a control command for requesting the information of the selected type and can transmit the control command to the mobile terminal 100. Subsequently, if audio data for the specific information type is received from the mobile terminal 100, the second controller 270 can control the received audio data to be outputted.

As an example, FIG. 14B shows an example of outputting weather information. Referring to FIG. 14B (*a*), a gesture input of pulling the left body part 330 and the right body part 330 to an inside direction corresponds to a user input for requesting the weather information. If audio data for the weather information is received from the mobile terminal 100 in response to the weather information request, as depicted in FIG. 14B (*b*), the second controller 270 can control the received audio data to be outputted.

FIG. 14C shows an example of outputting time information. Referring to FIG. 14C (*a*), a gesture input of pulling the left body part 330 to a bottom direction corresponds to a user input for requesting the time information. If audio data for the weather information is received from the mobile terminal 100 in response to the time information request, as depicted in FIG. 14C (*c*), the second controller 270 can control the received audio data to be outputted.

Figure 14D:
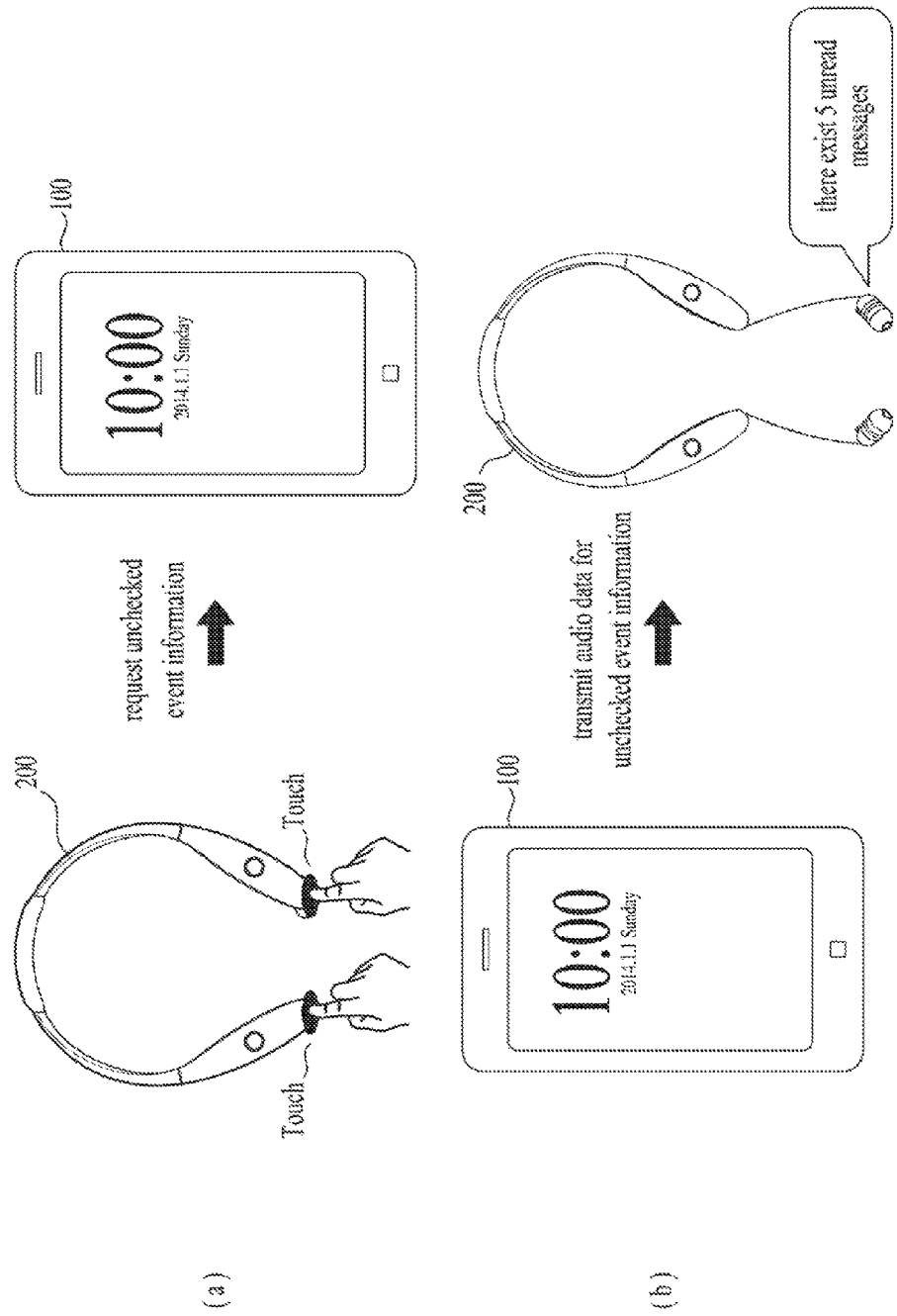

FIG. 14D shows an example of outputting unchecked event information. Referring to FIG. 14D (*a*), a gesture input of touching both ends of a pair of the body parts 330 corresponds to a user input for requesting time information. If audio data for the unchecked event information is received from the mobile terminal 100 in response to the unchecked event information request, as depicted in FIG. 14D (*c*), the second controller 270 can control the received audio data to be outputted.

When the wireless receiver 20 is in the information listening mode, if a predetermined user input for terminating the information listening mode is received, the second controller 270 can terminate the information listening mode. As an example, as depicted in FIG. 14A (*b*), if a gesture of tapping one of the pair of the body parts 330 twice is inputted, the second controller 270 can control the wireless receiver 200 to be free from the information listening mode.

In FIGS. 14A (*a*) and (*b*), a user input for entering or terminating the information listening mode corresponds to a gesture of tapping one of the pair of the body parts 330 twice, by which the present invention may be non-limited. The user input for controlling on/off of the information listening mode can be configured by one of the various gestures mentioned earlier with reference to FIG. 6A to FIG. 6J or combination thereof.

An example of outputting additional information related to information of a specific type is explained in the following.

FIGS. 15A, 15B, 16A and 16B are diagrams for examples of outputting additional information related to information of a specific type.

After the wireless receiver 200 outputs audio data for information of a specific type in the information listening mode, a user can input a user input for requesting additional information related to the information of the specific type. By doing so, if the user input for requesting the additional information related to the information of the specific type is received, the second controller 270 transmits a control command for requesting the additional information to the mobile terminal 100 and can receive audio data for the additional information from the mobile terminal 100.

As an example, FIG. 15A and FIG. 15B show an example of outputting additional information related to time information.

If the output of the time information is completed, the second controller 270 can control an audio querying whether to request additional information to be outputted via the earphones 220. Subsequently, as depicted in FIG. 15A, if a user input for requesting the additional information is received, the second controller 270 can make a request for transmission of audio data for the additional information related to time information. Referring to an example of FIG. 15A, a gesture of pulling one of the pair of the body parts 330 twice to the bottom direction corresponds to the user input requesting the additional information.

Subsequently, as depicted in FIG. 15A, if audio data for schedule information is received, the second controller 270 can control the received audio data to be outputted. As an example, the additional information can include schedule information which is configured on a current date.

As depicted in an example of FIG. 15B, if a user input not requesting the additional information is received, the second controller 270 does not make a request for the additional information. Referring to FIG. 15B, a gesture of pulling one of the pair of the body parts 330 twice to an outside direction corresponds to the user input for requesting the additional information.

Figure 16B:
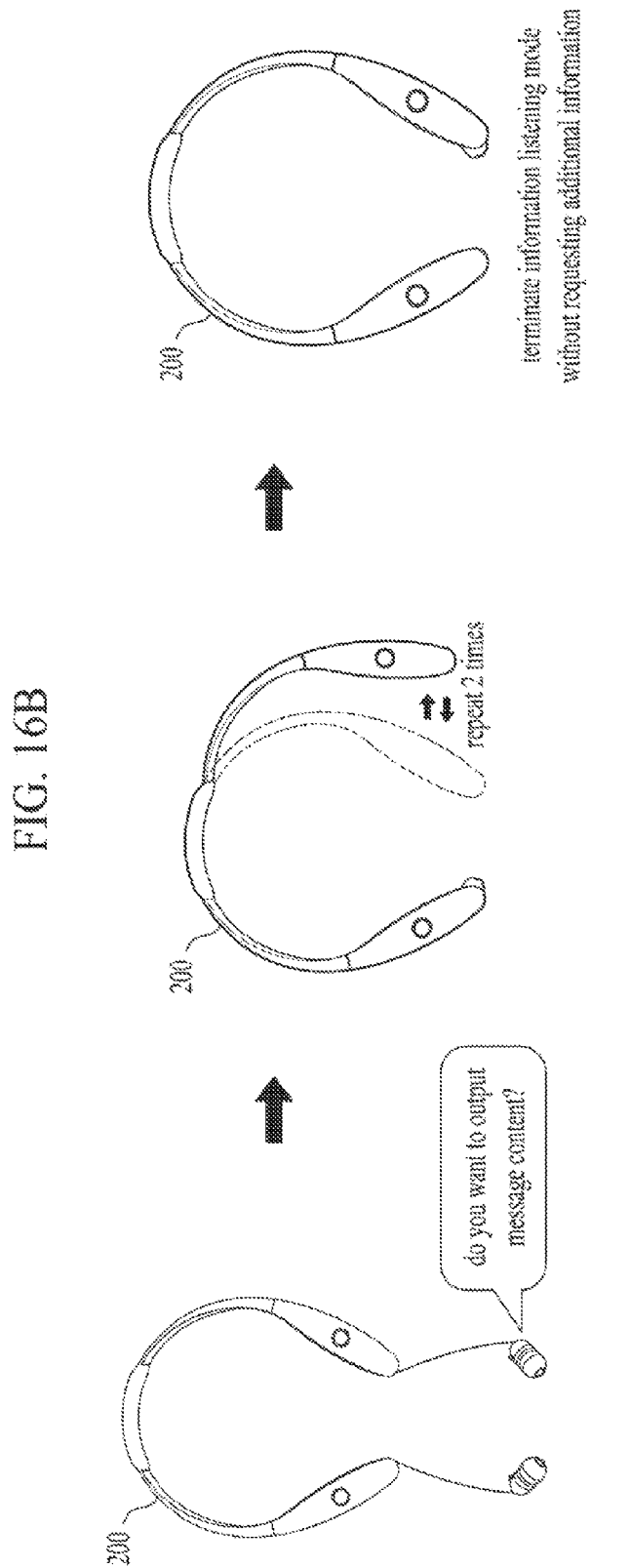

FIGS. 16A and 16B are diagrams for examples of outputting additional information related to unchecked event information.

If output of unchecked information is completed, the second controller 270 can control an audio querying whether to request additional information to be outputted via the earphones 220. Subsequently, as depicted in FIG. 16A, if a user input for requesting the additional information is received, the second controller 270 can make a request for transmission of audio data for the additional information (e.g., unchecked message content) related to unchecked information.

Subsequently, as depicted in FIG. 16A, if audio data for the unchecked message content is received, the second controller 270 can control the received audio data to be outputted.

As depicted in an example of FIG. 16B, if a user input not requesting the additional information is received, the second controller 270 does not make a request for the additional information. Referring to FIG. 16B, a gesture of pulling one of the pair of the body parts 330 twice to an outside direction corresponds to the user input for requesting the additional information.

If there exist a plurality of unchecked messages, the second controller 270 can sequentially receive audio data for a plurality of the message contents and may determine content of a message to be outputted according to a user input.

Figure 17:
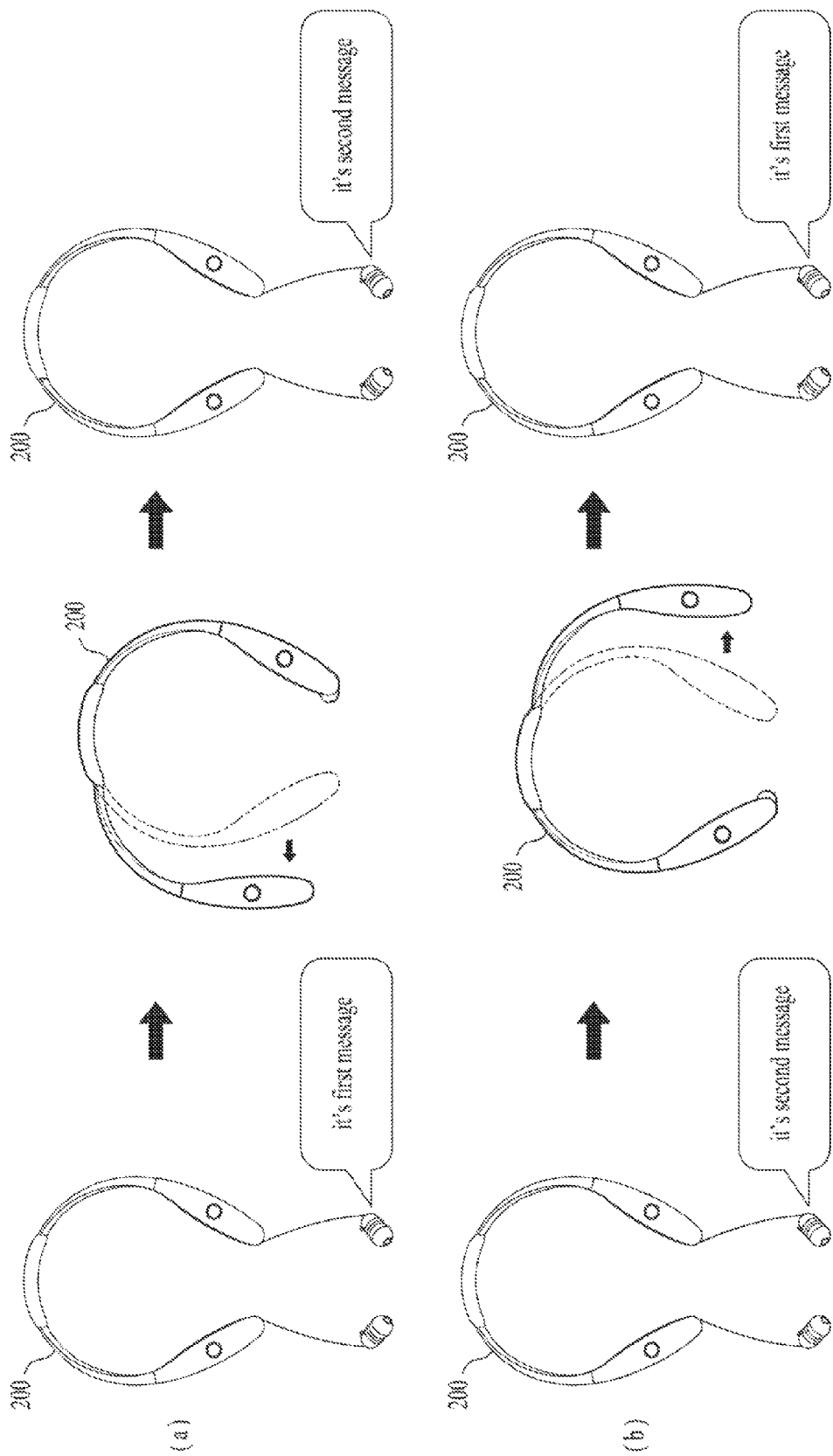
FIG. 17 is a diagram for explaining an example that a user controls a message content to be outputted.

As an example, FIG. 17 is a diagram for explaining an example that a user controls a message content to be outputted. For clarity, assume that the number of unchecked messages corresponds to 5.

As depicted in an example of FIG. 17 (a), if a user input for requesting a checking of a next message while content of a first unchecked message is outputted, content of a second unchecked message can be outputted via the wireless receiver 200.

As depicted in an example of FIG. 17 (b), if a user input for requesting a checking of a previous message while the content of the second unchecked message is outputted, the content of the first unchecked message can be outputted via the wireless receiver 200.

Referring to examples of FIGS. 17 (a) and (b), a gesture of pulling one of the pair of the body parts 330 to an outside direction corresponds to the user input to check the content of the next message and a gesture of pulling another one of the pair of the body parts 330 to the outside direction corresponds to the user input to check the content of the previous message. Moreover, it is apparent that an operation of a physical button, various gesture inputs mentioned earlier with reference to FIG. 6A to FIG. 6J or a combination thereof can be defined as the user input used for checking the content of the next message or the content of the previous message.

FIG. 13 shows an example that the wireless receiver 200 can output additional information after information of a specific type is outputted when additional information related to the information of the specific type is requested only. Unlike the example, the present invention can be implemented in a manner of omitting the step of requesting the additional information and the step of transmitting a control command. In this case, the wireless receiver 200 can receive audio data for the additional information related to the information of the specific type immediately after audio data for the information of the specific type is received.

Moreover, referring to FIG. 13, a type of specific information, which is to be requested to the mobile terminal 100, is determined according to a received user input after the wireless receiver enters an information listening mode. Unlike the example depicted in the drawing, if the wireless receiver enters the information listening mode, the second controller 270 can immediately make a request for the information of the specific type to the mobile terminal 100. By doing so, if a user input (e.g., a gesture of tapping one of the pair of the body parts 330 twice) for entering the information listening mode is inputted, the wireless receiver 200 can immediately output audio data for the information of the specific type such as weather information, time information and the like although additional user input is not received.

If the mobile terminal 100 receives an incoming signal while audio data of such a multimedia file as music, a video or the like is outputted via the wireless receiver 200, the output of the multimedia file is terminated and audio data which is newly generated according to the incoming signal is outputted. In this case, since the output of the audio data of the multimedia file used to be listened by a user is terminated, it may cause inconvenience to the user appreciating the multimedia file.

Hence, if a gesture of taking off the earphones 220 is inputted while the user is appreciating the multimedia file, the second controller 270 generates a control command to decline the incoming signal and the user can conveniently decline the incoming signal.

In this case, if a gesture of taking off one of a pair of the earphones 220 is inputted, the second controller 270 can transmit the control command for declining the incoming signal and a control command for resuming playback of the multimedia file to the mobile terminal 100. In this case, the output of the audio data, which is generated according to the reception of the incoming signal, is terminated and the output of the audio data of the multimedia file can be resumed.

On the contrary, if a gesture of taking off all of the pair of the earphones 220 is inputted, the second controller 270 can transmit the control command for declining the incoming signal and a control command for terminating the playback of the multimedia file to the mobile terminal 100. In this case, the output of the audio data, which is generated according to the reception of the incoming signal, is terminated and the output of the audio data of the multimedia file can be terminated as well.

Figure 18:
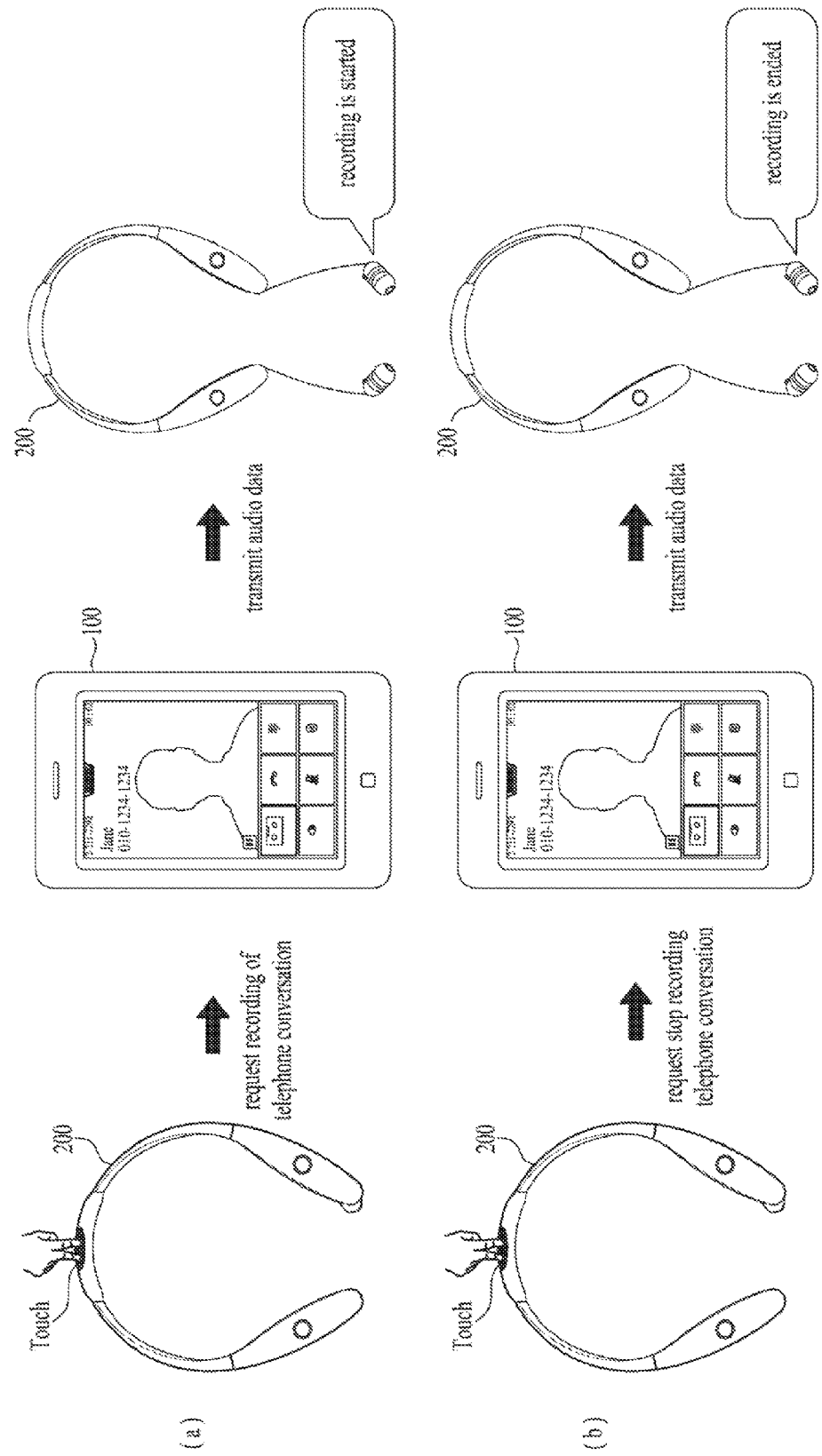
FIG. 18 is a diagram for an example of inputting a gesture, which directs to record a telephone conversation, to a wireless receiver.

If a prescribed user input is inputted via the wireless receiver 200 while a call is made, the second controller 270 can transmit a control command for recording a telephone conversation to the mobile terminal 100. As an example, FIG. 18 is a diagram for an example of inputting a gesture, which directs to record a telephone conversation, to a wireless receiver. As depicted in an example of FIG. 18 (a), if a gesture input touching the flexible part is detected in the middle of a telephone call, the second controller 270 generates a control command indicating the mobile terminal 100 to record a telephone conversation and can transmit the generated control command to the mobile terminal 100. If the control command is received, the first controller 180 can start to record the telephone conversation. Moreover, the first controller 180 can transmit audio data, which informs the start of recording the telephone conversation, to the wireless receiver 200. As depicted in an example of FIG. 18 (a), if the audio data is received, the second controller 270 can control the audio data, which informs the start of recording the telephone conversation, to be outputted.

Subsequently, as depicted in FIG. 18 (b), if a gesture input touching the flexible part is detected again, the second controller 270 generates a control command indicating the mobile terminal 100 to stop recording and can transmit the generated control command to the mobile terminal 100. If the control command is received, the first controller 180 can stop recording the telephone conversation. Moreover, the first controller 180 can transmit audio data indicating that the recording is stopped. As depicted in an example of FIG. 18 (b), if the audio data is received, the second controller 270 can control the audio data to be outputted.

The wireless receiver 200 can be used to set a new alarm to the mobile terminal 100.

Figure 19A:
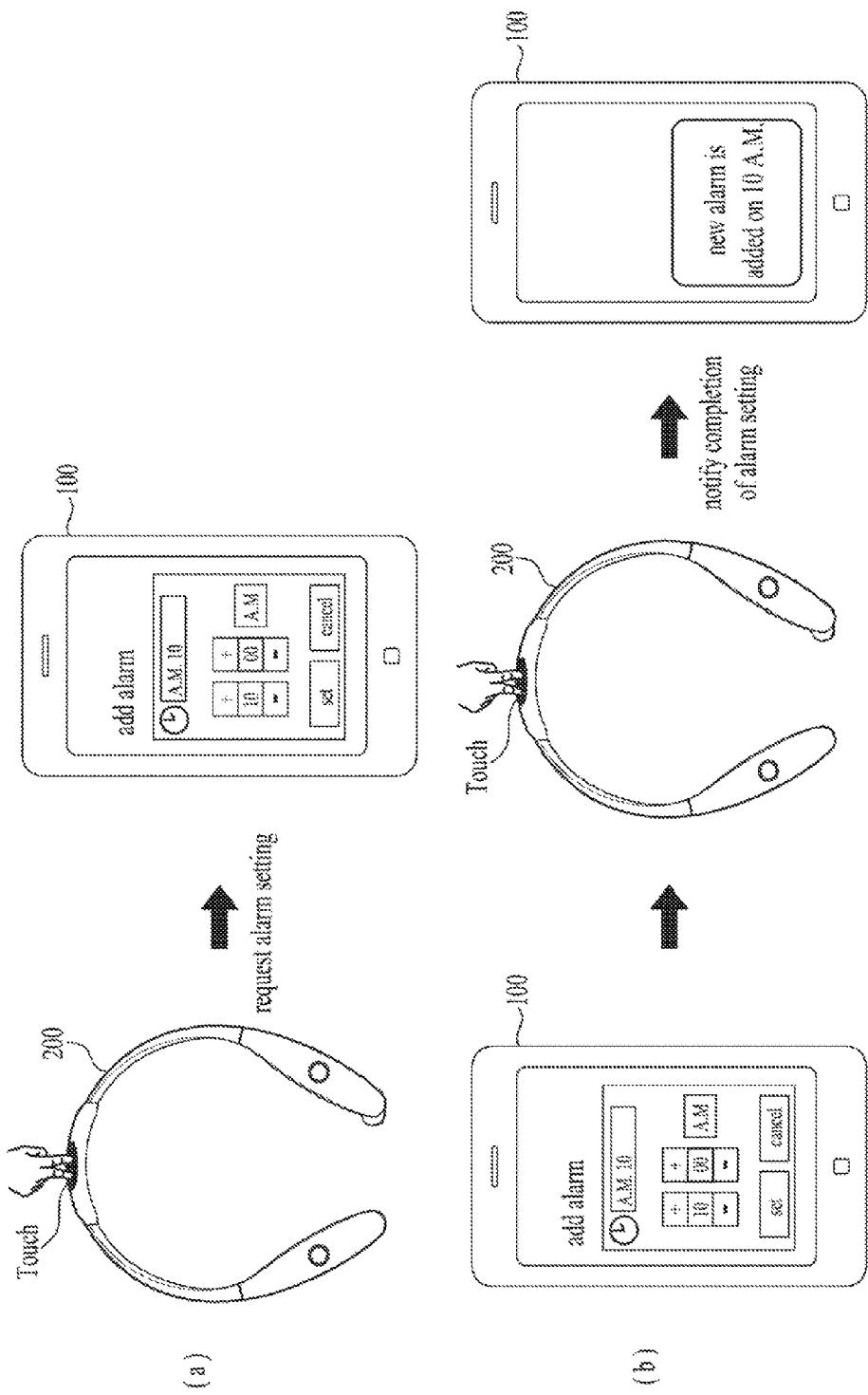
FIGS. 19A and 19B are diagrams for an example of setting a new alarm to a mobile terminal based on a gesture input putting on a wireless receiver.
Figure 19B:
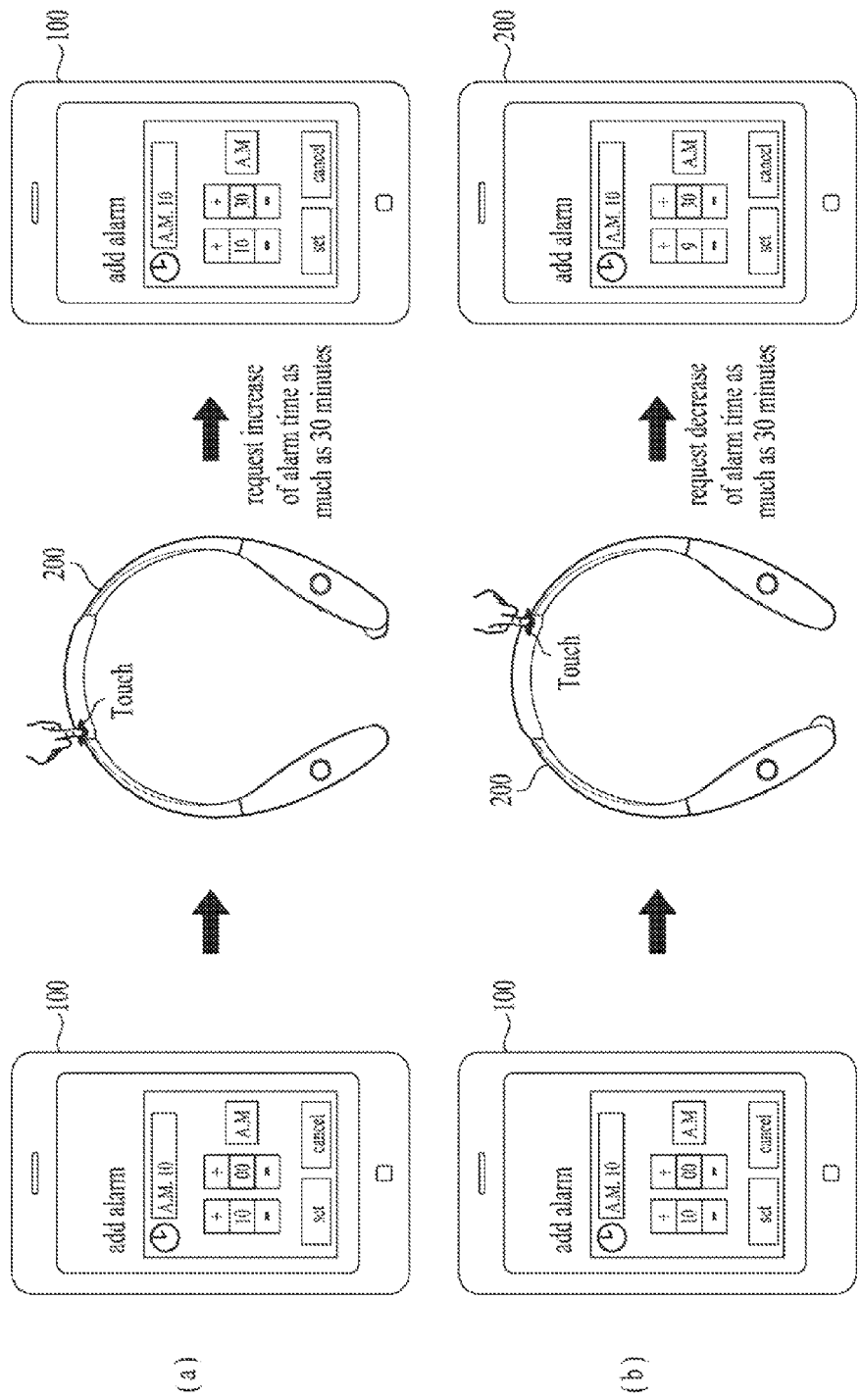

As an example, FIGS. 19A and 19B are diagrams for an example of setting a new alarm to a mobile terminal based on a gesture input putting on a wireless receiver. As depicted in an example of FIG. 19A (a), if a gesture input for setting a new alarm is received, the second controller 270 generates a control command for setting the new alarm and can transmit the generated control command to the mobile terminal 100. As depicted in an example of FIG. 19A (a), if the control command is received, the first controller 180 can control an alarm setting screen to be displayed. Referring to the example of FIG. 19A (a), touching the flexible part corresponds to the gesture input for setting the new alarm. Moreover, an operation of a physical button exposed to the external of the wireless receiver 200, one of various gesture inputs mentioned earlier with reference to FIG. 6A to FIG. 6J or a combination thereof can be defined as the gesture input for setting the new alarm.

When the alarm setting screen is displayed, a user can set alarm time in a manner of increasing or decreasing the alarm time with an interval of unit time. As an example, as depicted in an example of FIG. 19B (a), touching a boundary between the fixed part of one side and the flexible part corresponds to an input for increasing the alarm time as much as the unit time (e.g., 30 minutes). As depicted in an example of FIG. 19B (b), touching a boundary between the fixed part of another side and the flexible part corresponds to an input for decreasing the alarm time as much as the unit time.

Subsequently, as depicted in an example of FIG. 19A (b), if a gesture input for completing the alarm setting is received, the second controller 270 generates a control command for completing the alarm setting and can transmit the generated control command to the mobile terminal 100. As depicted in an example of FIG. 19A (b), if the control command is received, the first controller 180 can set a new alarm in accordance with currently configured time. Referring to the example of FIG. 19A (b), touching the flexible part corresponds to the gesture input for completing the alarm setting. Moreover, one of various gesture inputs mentioned earlier with reference to FIG. 6A to FIG. 6J or a combination thereof can be defined as the gesture input for completing the alarm setting.

In the aforementioned embodiments, an example of generating a control command capable of remotely controlling the mobile terminal 100 based on a gesture input putting on the wireless receiver 200 is described. As a different example, a user can remotely control the mobile terminal 100 in a manner of providing a voice command with a second microphone 240 of the wireless receiver 200.

Figure 20:
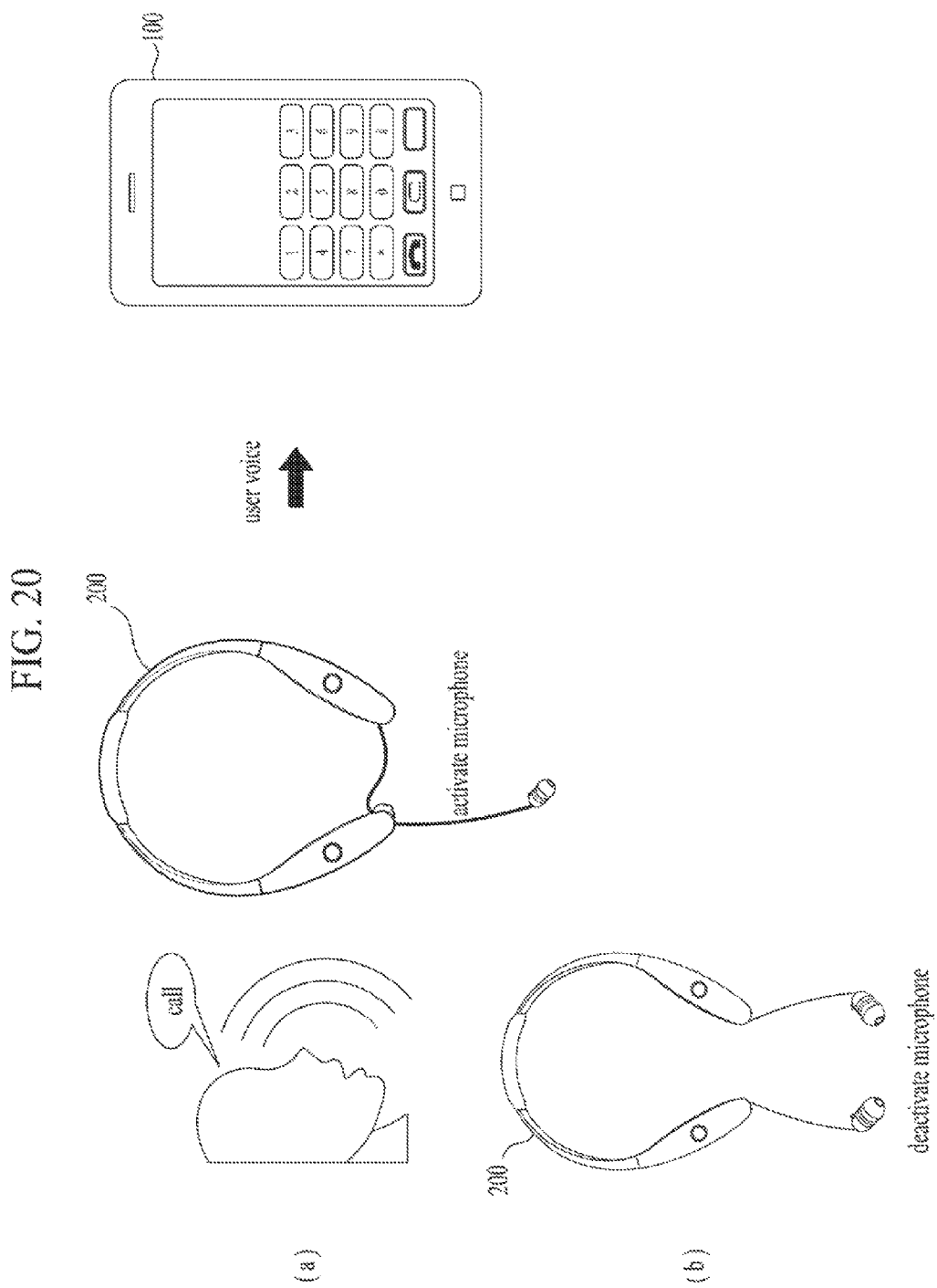
FIG. 20 is a diagram for an example of remotely controlling a mobile terminal based on a voice command.

As an example, FIG. 20 is a diagram for an example of remotely controlling a mobile terminal based on a voice command.

As depicted in an example of FIG. 20 (a), if a gesture input for storing one of a pair of earphones 220 in a storing home 336 of the body part 330 of a different side is inputted, the second controller 270 can activate the second microphone 240. Subsequently, the second controller 170 can transmit user voice, which is inputted via the second microphone 240, to the mobile terminal 100.

If the user voice is received from the wireless receiver 200, the first controller 180 can operate based on the received user voice. As depicted in an example of FIG. 20 (a), if the user voice corresponds to 'call', the first controller can control a call function to be activated.

As depicted in an example of FIG. 20 (b), if one of a pair of earphones 220, which is stored in the storing home 336 of the body part 330 of a different side, is separated from the storing home 336, the second controller can control the second microphone 240 to be deactivated.

A control command for remotely controlling the mobile terminal 100 is generated based on a user input and the generated control command can be transmitted to the mobile terminal 100.

Accordingly, embodiments of the present invention provide various effects and/or features.

The present invention can provide a wireless receiver enhancing user convenience.

Specifically, the present invention can provide a wireless receiver capable of outputting audio data for a caller who made a call to a mobile terminal and a method of controlling therefor.

Additionally, according to at least one of embodiments of the present invention, a wireless receiver capable of remotely controlling a mobile terminal and a method of controlling therefor can be provided.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wearable wireless receiver, comprising:
a curved frame shaped to be wearable around a neck of a user, the frame having a receiving portion;
a speaker sized to be storable at the receiving portion, the speaker positioned at a first position when the speaker is stored at the receiving portion and the speaker positioned at a second position when the speaker is withdrawn from the receiving portion;
a short-range communication unit configured to communicate with a mobile terminal; and
a controller configured to:
    cause the speaker to output first audio data in response to a first signal received from the mobile terminal via the short-range communication unit when a first call is received by the mobile terminal from a communication device while the speaker is positioned at the second position, the first audio data containing information identifying the communication device; and
    cause the mobile terminal to decline the first call in response to movement of the speaker from the second position to the first position.

2. The wireless receiver of claim 1, wherein:
the information comprises a name assigned to the communication device when the information or name is pre-stored in the mobile terminal prior to receiving the first call; and
the information comprises a telephone number assigned to the communication device when the information is not pre-stored in the mobile terminal prior to receiving the first call.

3. The wireless receiver of claim 1, wherein:
the controller is further configured to cause the receiver to vibrate in response to a second signal received from the mobile terminal via the short-range communication unit when a second call is received by the mobile terminal from the communication device while the receiver is worn by the user and the speaker is positioned at the first position;

the receiver vibrates in a first pattern when the information is pre-stored in the mobile terminal prior to receiving the second call; and the receiver vibrates in a second pattern when the information is not pre-stored in the mobile terminal.

4. The wireless receiver of claim 1, wherein the speaker comprises a pair of speakers that are positionable relative to both ears of the user, and the controller is further configured to:

cause the pair of speakers to output second audio data when a message is received by the mobile terminal from the communication device;

cause the mobile terminal to delete the message in response to a gesture of taking off only one of the pair of speakers from one of the ears; and cause the mobile terminal to register a telephone number corresponding to the communication device as a spam number in response to a gesture of taking off both of the pair of speakers from the ears.

5. The wireless receiver of claim 1, further comprising a sensing unit configured to sense whether the speaker is positioned at the first position or the second position, wherein the first audio data is not output via the speaker when the sensing unit senses that the speaker is positioned at the first position.

6. The wireless receiver of claim 1, wherein the controller is further configured to cause the speaker to output second audio data when a message is received by the mobile terminal from the communication device, the second audio data containing the information identifying the communication device.

7. The wireless receiver of claim 6, wherein the information, which is pre-stored in the mobile terminal prior to receiving the message, comprises a name assigned to the communication device.

8. The wireless receiver of claim 6, wherein the information, which is not pre-stored in the mobile terminal prior to receiving the message, comprises a telephone number assigned to the communication device.

9. The wireless receiver of claim 6, wherein the controller is further configured to cause the wireless receiver to vibrate in response to the message and generate:

a vibration in a first pattern when the message is a first type of message comprising an email; and a vibration in a second pattern when the message is a second type of message comprising a text message.

10. The wireless receiver of claim 1, further comprising a sensing unit configured to detect a first gesture input caused by the wireless receiver, wherein the controller is further configured to:

cause the short-range communication unit to transmit a first request for information corresponding to the first gesture input to the mobile terminal in response to the first gesture input; and cause the speaker to output second audio data that is received from the mobile terminal in response to the first request.

11. The wireless receiver of claim 10, wherein the first gesture input is one of various types of gesture inputs generated via various portions of the wireless receiver and detectable by the sensing unit, and the controller is further configured to determine a type of the information to be requested according to a type of the first gesture input.

12. The wireless receiver of claim 10, wherein the sensing unit is further configured to detect a second gesture input caused by the wireless receiver in response to the second audio data, and the controller is further configured to cause the short-range communication unit to transmit a second request for additional information corresponding to the second gesture input and related to the information corresponding to the first gesture input to the mobile terminal in response to the second gesture input.

13. The wireless receiver of claim 10, wherein the second audio data comprises at least one selected from the group consisting of weather information, time information and schedule information.

14. The wireless receiver of claim 1, wherein the controller is further configured to cause the short-range communication unit to transmit a control command for declining the first call to the mobile terminal in response to a user input generated when the speaker that is in the second position is taken off from an ear of the user while the receiver is worn by the user.

15. The wireless receiver of claim 1, wherein the controller is further configured to:

cause the mobile terminal to accept the first call in response to a first user input; and cause the short-range communication unit to transmit a control command for recording communication between the mobile terminal and the communication device to the mobile terminal in response to a second user input received when the communication has been established.

16. A method of controlling a wearable wireless receiver comprising a curved frame shaped to be wearable around a neck of a user, the frame having a receiving portion; a speaker sized to be storable at the receiving portion, the speaker positioned at a first position when the speaker is stored at the receiving portion and the speaker positioned at a second position when the speaker is withdrawn from the receiving portion; and a short-range communication unit configured to communicate with a mobile terminal, the method comprising:

outputting first audio data via the speaker in response to a first signal received from the mobile terminal via the short-range communication unit when a first call is received by the mobile terminal from a communication device while the speaker is positioned at the second position; and causing the mobile terminal to decline the first call in response to movement of the speaker from the second position to the first position.

17. The method of claim 16, wherein:

the information comprises a name assigned to the communication device when the information is pre-stored in the mobile terminal prior to receiving the call; and the information comprises a telephone number assigned to the communication device when the information is not pre-stored in the mobile terminal prior to receiving the call.

18. The method of claim 16, further comprising:

vibrating the receiver in response to a second signal received from the mobile terminal via the short-range communication unit when a second call is received by the mobile terminal from the communication device while the receiver is worn by the user and the speaker is positioned at the first position;

vibrating the receiver in a first pattern when the information is pre-stored in the mobile terminal prior to receiving the second call; and vibrating the receiver in a second pattern when the information is not pre-stored in the mobile terminal.

19. The method of claim 16, wherein the speaker comprises a pair of speakers that are positionable relative to both ears of the user, the method further comprising:

causing the pair of speakers to output second audio data when a message is received by the mobile terminal from the communication device;

causing the mobile terminal to delete the message in response to a gesture of taking off only one of the pair of speakers from one of the ears; and causing the mobile terminal to register a telephone number corresponding to the communication device as a spam number in response to a gesture of taking off both of the pair of speakers from the ears.

20. The method of claim 16, further comprising:

sensing whether the speaker is positioned at the first position or the second position, wherein the first audio data is not output via the speaker when the wireless receiver senses that the speaker is positioned at the first position.

21. The wireless receiver of claim 1, wherein:

the speaker comprises a pair of speakers that are positionable at both ears of the user;

the short-range communication unit is further configured to receive a third signal from the mobile terminal when a third call is received by the mobile terminal from the communication device while audio data of a multimedia file is output via the speaker; and the controller is further configured to pause the output of the audio data of the multimedia file and to output a third audio data in response to the third signal.

22. The wireless receiver of claim 21, wherein the controller is further configured to cause the short-range communication unit to transmit a control command for declining the third call and resuming playback of the multimedia file to the mobile terminal in response to a gesture of taking off only one of the pair of speakers from one of the ears, causing termination of the output of the third audio data and resuming the output of the audio data of the multimedia file.

23. The wireless receiver of claim 21, wherein the controller is further configured to cause the short-range communication unit to transmit a control command for declining the third call and terminating playback of the multimedia file to the mobile terminal in response to a gesture of taking off both of the pair of speakers from the ears, causing termination of the output of both the third audio data and the audio data of the multimedia file.

24. The wireless receiver of claim 1, wherein:

the frame includes a first body part and a second body part, each of the first body part and the second body part having a corresponding receiving portion;

each of the first body part and the second body part is movable in at least a first direction and a second direction that is opposite to the first direction, a first input generated in response to a first movement in the first direction and a second input generated in response to a second movement in the second direction;

the first input and the second input result in different operations;

the wireless receiver further comprises a sensor configured to sense at least the first movement and the second movement or a position of at least one of the first body part or the second body part.

25. The wireless receiver of claim 24, wherein the controller is further configured to cause the short-range communication unit to communicate with the mobile terminal in response to the sensed first or second movement or the sensed position of the at least one of the first body part or the second body part.

26. The wireless receiver of claim 24, wherein:

the speaker comprises a first speaker storable at a first receiving portion formed at the first body part and a second speaker storable at a second receiving portion formed at the second body part;

the first speaker is connected to a first cable such that the first speaker is storable at the first receiving portion when the first cable is rolled up;

the second speaker is connected to a second cable such that the second speaker is storable at the second receiving portion when the second cable is rolled up.

27. The wireless receiver of claim 24, further comprising a button located at the first body part or the second body part, wherein in response to user input received via the button, the controller is further configured to:

cause the short-range communication unit to communicate with the mobile terminal; and activate a calling function to be performed by the mobile terminal.

28. The wireless receiver of claim 27, wherein the controller is further configured to control speed dialing performed by the mobile terminal in response to the sensed first or second movement or the sensed position of the at least one of the first body part or the second body part.

29. The wireless receiver of claim 24, wherein:

the sensor is further configured to sense a tapping on at least one of the first body part or the second body part;

the controller is further configured to activate an information listing mode in response to the sensed tapping;

the controller is further configured to cause the speaker to output second audio data based on information received from the mobile terminal in response to the first or second movement or the position of the at least one of the first body part or the second body part sensed while the information listing mode has been activated; and a type of the information received from the mobile terminal is determined based on the first or second movement or a change of the position.

30. The wireless receiver of claim 24, wherein:

the frame further includes a flexible part, a first fixed part connected to a first portion of the flexible part, and a second fixed part connected to a second portion of the flexible part;

the first body part is connected to the first fixed part and the second body part is connected to the second fixed part.

31. The wireless receiver of claim 30, wherein the controller is further configured to cause the mobile terminal to perform a designated function in response to a first touch applied to the flexible part.

32. The wireless receiver of claim 31, wherein the designated function is setting a new alarm, and the mobile terminal displays an alarm setting screen in response to the first touch.

33. The wireless receiver of claim 31, wherein:

the controller is further configured to control an operation of the designated function based on a second touch received via a first boundary between the first fixed part and the flexible part or via a second boundary between the second fixed part and the flexible part; and the operation of the designated function is controlled differently depending on whether the second touch received via the first boundary or the second boundary.

* * * * *